United States Patent
Yokoyama

(10) Patent No.: US 8,325,683 B2
(45) Date of Patent: Dec. 4, 2012

(54) COMMUNICATION DEVICE

(75) Inventor: Hitoshi Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 558 days.

(21) Appl. No.: 11/648,573

(22) Filed: Jan. 3, 2007

(65) Prior Publication Data

US 2008/0002626 A1    Jan. 3, 2008

(30) Foreign Application Priority Data

Jun. 30, 2006    (JP) .................... 2006-180739

(51) Int. Cl.
*H04W 4/00*    (2009.01)

(52) U.S. Cl. ........ 370/332; 370/331; 455/436; 455/442; 455/561; 455/571

(58) Field of Classification Search .......... 370/335, 370/331, 319, 349, 389, 342, 332, 310.2, 370/311, 328, 338; 455/456, 464, 404, 560, 455/561, 432.1–444, 13.4, 550.1, 552.1, 455/553.1, 556.1, 556.2, 571–574, 127.1, 455/127.5, 298, 456.5, 418–422.1, 522, 161.1, 455/164.1, 164.2, 192.1, 192.2, 232.1, 234.1, 455/239.1, 240.1, 245.1, 250.1, 299, 341, 455/343.1–343.6

See application file for complete search history.

(56) References Cited

U.S. PATENT DOCUMENTS

| | | | | |
|---|---|---|---|---|
| 5,287,544 A * | 2/1994 | Menich et al. | | 455/450 |
| 6,285,665 B1 * | 9/2001 | Chuah | | 370/319 |
| 6,304,562 B1 * | 10/2001 | Kim et al. | | 370/332 |
| 6,463,290 B1 * | 10/2002 | Stilp et al. | | 455/456 |
| 6,473,411 B1 * | 10/2002 | Kumaki et al. | | 370/331 |
| 6,507,572 B1 * | 1/2003 | Kumar et al. | | 370/335 |
| 6,519,465 B2 * | 2/2003 | Stilp et al. | | 455/456 |
| 2002/0094837 A1 * | 7/2002 | Hamabe et al. | | 455/522 |
| 2002/0111184 A1 * | 8/2002 | Takano et al. | | 455/522 |
| 2002/0122410 A1 * | 9/2002 | Kulikov et al. | | 370/349 |
| 2003/0013451 A1 * | 1/2003 | Walton | | 455/447 |
| 2003/0064734 A1 * | 4/2003 | Stilp et al. | | 455/456 |
| 2003/0169746 A1 | 9/2003 | Kitazawa et al. | | |
| 2004/0203991 A1 * | 10/2004 | Chen et al. | | 455/522 |
| 2004/0242257 A1 * | 12/2004 | Valkealahti et al. | | 455/522 |
| 2005/0277419 A1 * | 12/2005 | Takano et al. | | 455/442 |
| 2006/0239238 A1 * | 10/2006 | Fernandez-Corbaton et al. | | 370/342 |

FOREIGN PATENT DOCUMENTS

EP    1 341 318 A2    9/2003

(Continued)

OTHER PUBLICATIONS

Extended European search report; Application No. 07250170.3-1246; P107689EP00, 7 pages.

(Continued)

*Primary Examiner* — Jinsong Hu
*Assistant Examiner* — San Htun
(74) *Attorney, Agent, or Firm* — Myers Wolin, LLC

(57) ABSTRACT

A communication device enables transmitting remaining packets to a terminal during a handover, with reduced inter-cell interference and with improved throughput. The communication device allocates a plurality of frequency bands each to different terminals for wireless communication. A power booster increases transmission power of one of the frequency bands, and a frequency band allocator allocates the frequency band with the increased transmission power to a terminal that is performing a handover. Thus, the communication device can transmit the remaining packets to the terminal with the increased transmission power.

13 Claims, 28 Drawing Sheets

FOREIGN PATENT DOCUMENTS

| | | |
|---|---|---|
| JP | 2002-320277 | 10/2002 |
| JP | 2003-258806 | 9/2003 |
| JP | 2003-319432 | 11/2003 |
| JP | 2004-7030 A | 1/2004 |
| WO | 2004/057887 | 7/2004 |

OTHER PUBLICATIONS

Japanese Patent Office "Office Action" issued for corresponding Japanese Patent Application No. 2006-180739, issued Mar. 8, 2011. Partial English translation attached.

* cited by examiner

COMMUNICATION DEVICE

CROSS-REFERENCE TO RELATED APPLICATIONS

This application is based upon and claims the benefits of priority from the prior Japanese Patent Application No. 2006-180739 filed on Jun. 30, 2006, the entire contents of which are incorporated herein by reference.

BACKGROUND OF THE INVENTION

1. Field of the Invention

The present invention relates to communication devices, and more particularly, to a communication device incorporated in a base station for allocating one of a plurality of frequency bands to a terminal to enable wireless communication.

2. Description of the Related Art

In cellular mobile communications system, mobile terminals communicate with a base station on radio channels. As a terminal moves during communication, switchover from one base station to another may take place to keep the wireless communication alive. This switchover operation is called a "handover" in cellular terminology.

Referring to FIG. 26 showing a mobile communication system, an example of handover will be explained. This figure shows base stations (BSs) 101 and 102, a terminal 111, and cells 121 and 122 representing the coverage of the respective base stations 101 and 102.

The terminal 111 receives common pilots from the base stations 101 and 102, and compares the received power levels to determine whether to ask for a handover (HO).

As the terminal 111 moves from the current cell 121 toward its neighboring cell 122 as indicated by the arrow in FIG. 26, the terminal 111 receives a higher power level from the neighboring base station 102. At this time, the terminal 111 sends a handover request to the current base station 101 to initiate a handover to the base station 102.

FIG. 27 illustrates a handover operation in the mobile communication system. This operation is performed by the terminal 111 and the base stations 101 and 102, all appearing in FIG. 26, and a core network (CN).

Step S121: The terminal 111 in the cell 121 exchanges packets with the core network through the current base station 101. Using the general and common core network protocol, the terminal 111 could communicate with another terminal or the like (normal communication).

Step S122: Suppose that the terminal 111 moves into the cell 122. Consequently, the pilot power level of the base station 102 becomes higher than that of the base station 101, and thus the terminal 111 sends a handover request to the base station 101.

Step S123: The base station 101 transfers the received handover request to the base station 102 which is the target of handover.

Step S124: On receiving the handover request from the terminal 111, the base station 102 sends a switching request to the core network. Consequently, the core network switches the edge node from the base station 101 to the base station 102.

Step S125: The base station 101 transmits untransmitted packets remaining therein to the terminal 111.

Step S126: The core network, having received the switching request, starts to route packets destined for the terminal 111 to the base station 102.

Step S127: On completing the transmission of all the remaining packets to the terminal 111, the base station 101 sends a handover switching request to the terminal 111.

Step S128: The core network routes packets to the base station 102, if any.

Step S129: The terminal 111, having received the handover switching request transmits a packet send request to the base station 102.

Step S130: The core network keeps routing packets to the base station 102, if any. Those packets are accumulated in the base station 102.

Step S131: The base station 102, having received the send request, starts to transmit accumulated packets to the terminal 111.

Step S132: The terminal 111 exchanges packets with the core network through the base station 102. Using the general and common core network protocol, the terminal 111 could communicate with another terminal or the like (normal communication).

As described above, when the terminal 111 sends the handover request, the handover source base station 101 has remaining packets to be transmitted, and subsequent packets (packets in steps S126, S128, and S130) are transmitted and accumulated in the handover target base station 102.

FIG. 28 illustrates remaining packets and accumulated packets. In FIG. 28, like reference numerals are used to denote like elements appearing in FIG. 26, and description of such elements is omitted.

This figure shows a memory 131 storing packets remaining in the base station 101, a memory 132 storing packets accumulated in the base station 102, and a core network 141. At the time of a handover, the terminal 111 receives the remaining packets from the base station 101, and then the accumulated packets from the base station 102.

Since the terminal 111 sends a handover request when a power level from the base station 102 becomes higher than that from the base station 101, the terminal 111 has to receive the remaining packets from the base station 101 under interference of the cell 122 of the base station 102.

As stated above, a handover takes place around the boundary between cells, and therefore, the adjacent cell interferes with reception of remaining packets, which results in a lower throughput of the packets.

Meanwhile, a cellular system has been proposed in which a mobile station can transmit Acknowledge/Non-Acknowledge (ACK/NACK) signals through High-speed Dedicated Physical Control Channel (HS-DPCCH) at a low error rate and without packet loss even when it is connected to a plurality of base stations on Dedicated Physical Channel (DPCH) to achieve a soft handover (cf. Japanese Unexamined Patent Publication No. 2004-7030).

SUMMARY OF THE INVENTION

The present invention was made in view of the above circumstances, and an object thereof is to provide a communication device which allows remaining packets to be transmitted under reduced inter-cell interference, to thereby improve throughput of the remaining packets.

To achieve the object, there is provided a communication device incorporated in a base station for allocating a plurality of frequency bands each to different terminals, to enable wireless communication. The communication device comprises a power booster for increasing transmission power of one of the frequency bands, and a frequency band allocator for allocating the frequency band with the increased transmission power to a terminal which is performing a handover.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The principles of the present invention will be described below with reference to the accompanying drawings.

Figure 1:
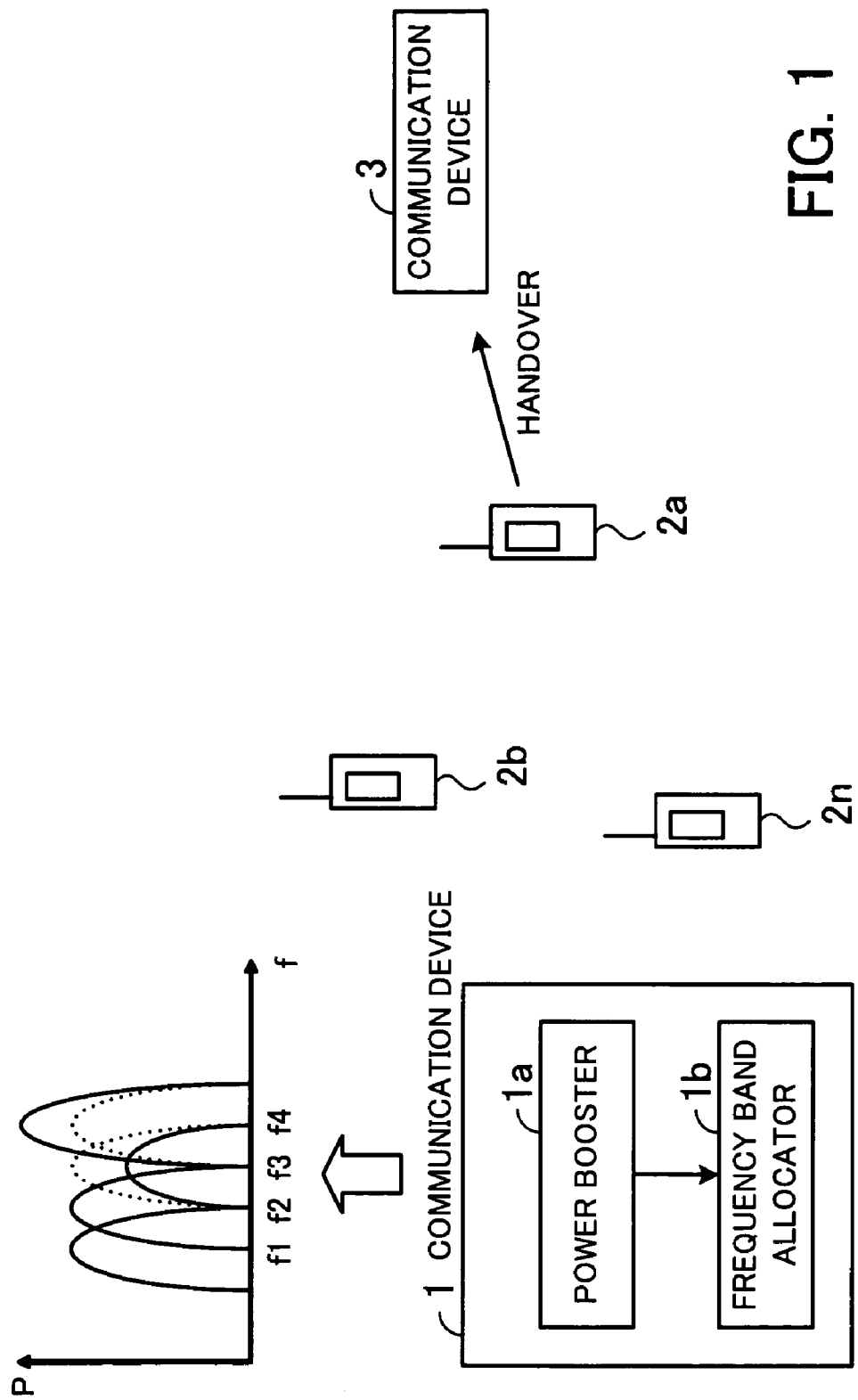
FIG. 1 schematically illustrates a communication device.

FIG. 1 schematically illustrates a communication device. This figure shows communication devices 1 and 3 installed in respective base stations, and terminals 2a to 2n communicating on radio channels with the communication device 1, along with a graph showing the relationships between frequency bands allocated to the terminals 2a to 2n by the communication device 1 and transmission power levels.

The communication device 1 allocates a plurality of frequency bands f1 to f4 each to different terminals 2a to 2n for wireless communication. For example, frequency band f1 is allocated to the terminal 2a, frequency band f2 to the terminal 2b, and frequency band f3 to the terminal 2n. The communication device 1 includes a power booster 1a and a frequency band allocator 1b.

In usual circumstances the power booster 1a equally distributes transmission power among the frequency bands f1 to f4. When a handover is requested, the power booster 1a increases transmission power of one of the frequency bands f1 to f4, including both transmit data and pilot. Then the frequency band allocator 1b allocates the frequency band with the increased transmission power to the requesting terminal.

Suppose that the terminal 2a is experiencing a handover from the communication device 1 to the communication device 3. The power booster 1a increases the transmission power of frequency band f4, as seen from the graph of FIG. 1. Then the frequency band allocator 1b allocates that frequency band f4 to the terminal 2a. The increased transmission power suppresses inter-cell interference and allows the communication device 1 to transmit remaining packets to the terminal 2a with improved throughput.

Preferred embodiments of the present invention will now be described in detail with reference to the drawings, wherein like reference numerals refer to like elements throughout.

Figure 2:
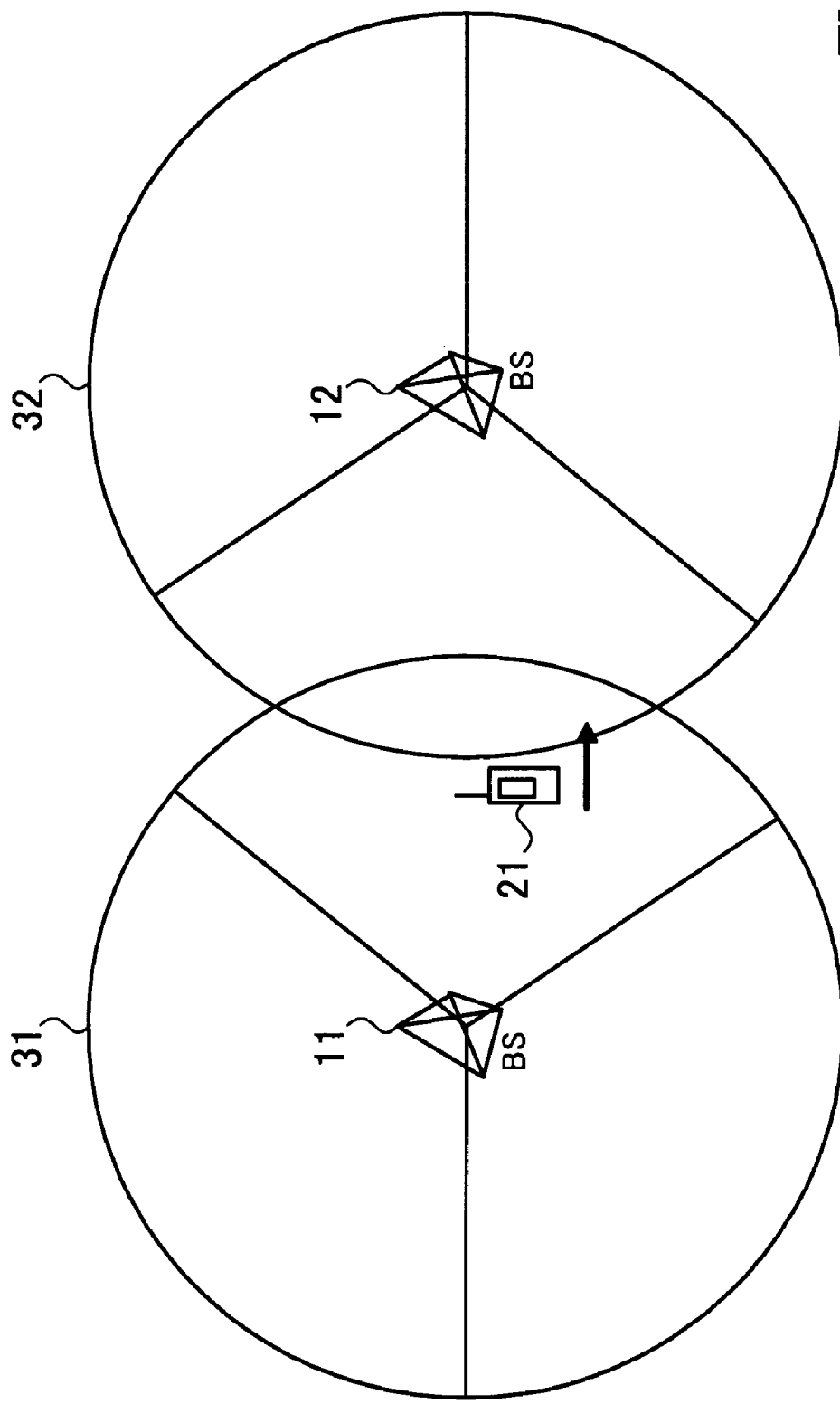
FIG. 2 shows an exemplary configuration of a mobile communication system.

FIG. 2 shows an exemplary configuration of a mobile communication system. This figure shows base stations 11 and 12, a terminal 21, and cells 31 and 32 representing the coverage of the respective base stations 11 and 12.

The terminal 21 receives common pilots from the base stations 11 and 12. Then, based on the received common pilots, the terminal 21 calculates and sends wireless qualities such as Channel Quality Indicator (CQI) to the base stations 11 and 12. In accordance with the received wireless quality, each of the base stations 11 and 12 allocates one of a plurality of frequency bands to the terminal 21 for communication.

The terminal 21 compares the received power levels of the common pilots to determine whether to ask for a handover. As indicated by the arrow in FIG. 2, when the terminal 21 moves from the cell 31 into the cell 32 and find that the received power from the base station 12 has become higher than that from the base station 11, the terminal 21 sends a handover request to the base station 11 for a handover to the base station 12.

The handover source base station 11 receiving this request increases transmission power of one frequency band and allocates frequency band to the requesting terminal 21. The handover target base station 12 detects the frequency band used by the terminal 21 as interference signal and decreases transmission power of that frequency band.

As described above, the handover source base station 11 assigns the frequency band with increased power to the terminal 21 while the handover target base station 12 decreases power of the frequency band used by the terminal 21, whereby inter-cell interference can be reduced and this improves transmission/reception throughput of remaining packets.

The following describes in detail how the base stations 11 and 12 shown in FIG. 2 change transmission power. First, the power increase by the handover source base station 11 will be explained.

Figure 3:
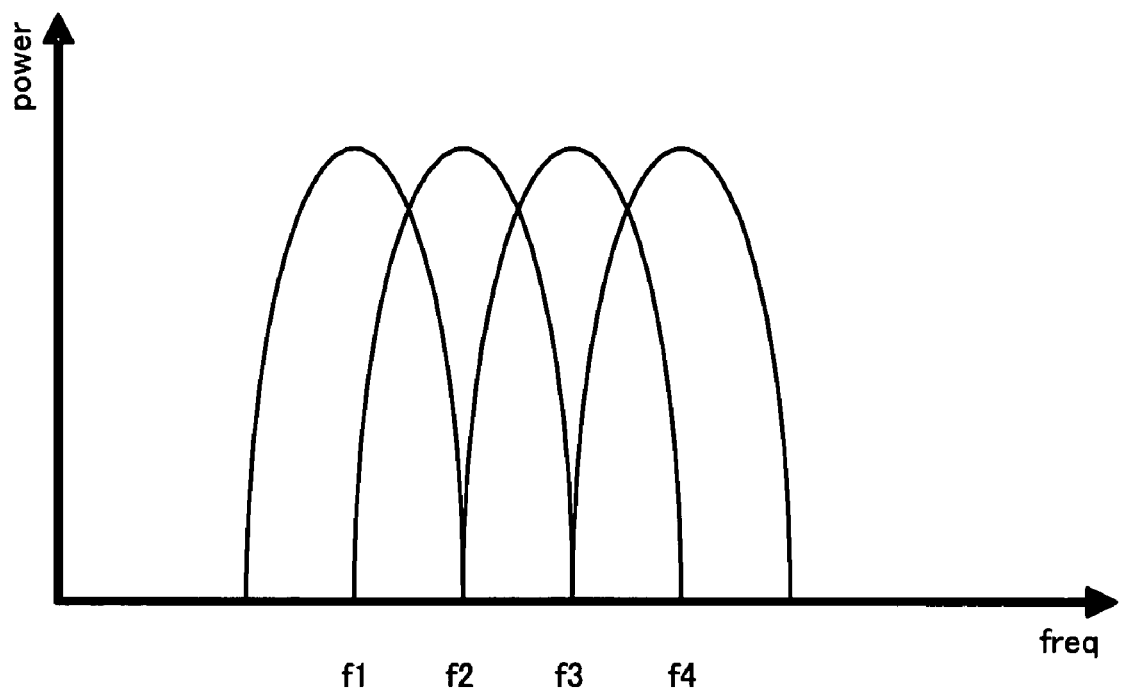
FIG. 3 shows power levels of a base station during normal communication.

FIG. 3 is a graph showing the power levels of the base station during normal communication, wherein the horizontal axis indicates frequency bands allocated to terminals and the vertical axis indicates transmission power levels of the base station 11.

The base station 11 allocates one of the frequency bands f1 to f4, for example, to the terminal 21 for communication. While a handover is not executed (during normal communication), the base station 11 equally distributes power among the frequency bands f1 to f4, as shown in FIG. 3.

Figure 4:
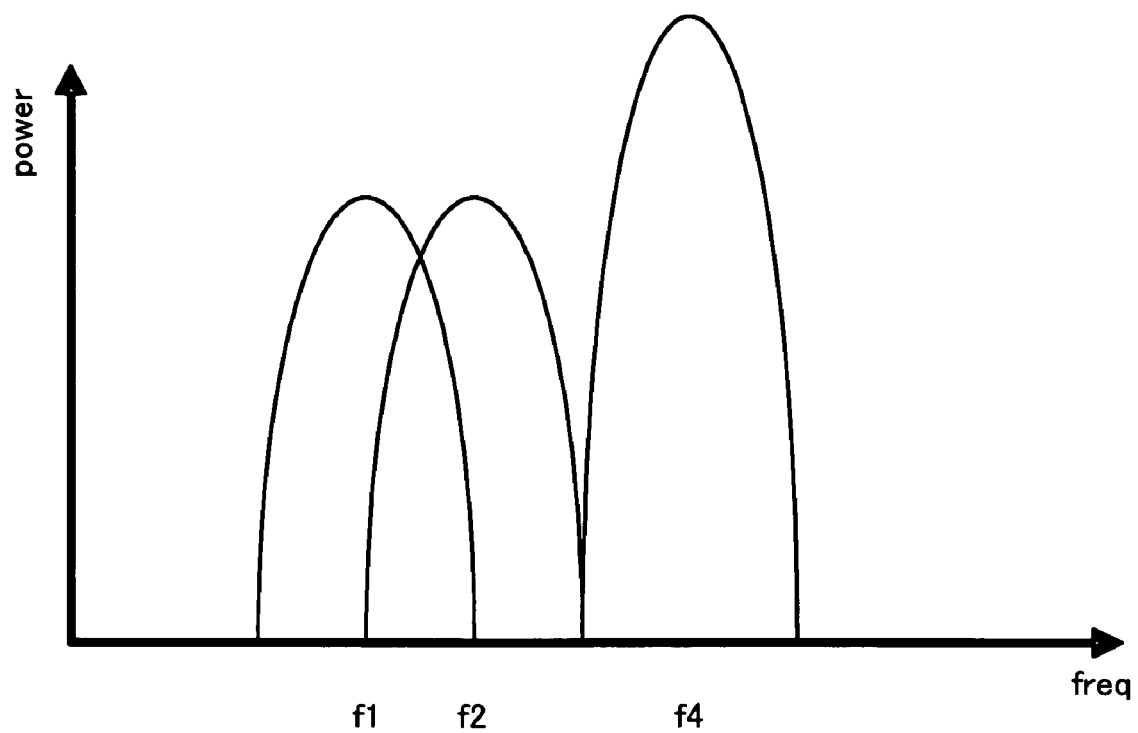
FIG. 4 shows power levels of the base station receiving a handover request.

FIG. 4 is a graph showing the power levels of the base station that has received a handover request, wherein the horizontal axis indicates frequency bands and the vertical axis indicates transmission power levels.

On receiving a handover request from the terminal 21, the base station 11 increases power of one of the frequency bands. For example, the base station 11 increases the power of frequency band f4, as shown in FIG. 4. Then, the base station 11 allocates that frequency band f4 to the requesting terminal 21, so as to communicate with the terminal 21 with increased power.

It should be noted that the base station 11 may increase the power of the frequency band currently used by a requesting terminal. Specifically, if the terminal sends a handover request at frequency band f4, the power of that frequency band f4 may be increased.

To increase the power of frequency band f4, the power of the other frequency bands f1 to f3 should be controlled because the total transmission power of a base station is fixed. For example, the power for frequency band f3 is allotted to frequency band f4 so as not to exceed the maximum limit of total transmission power, as shown in FIG. 4.

In the case where frequency band f3 devotes its entire port to frequency band f4, the power of frequency band f4 increases by +3 dB. Consequently, assuming that the inter-cell interference remains unchanged, the wireless quality (CQI) of the terminal 21 improves by +3 dB. That is to say, the CQI correlated with the maximum transmission rate can be improved by +3 dB, thus making it possible to improve the throughput.

Scheduling of the base station 11 will now be explained.

Figure 5:
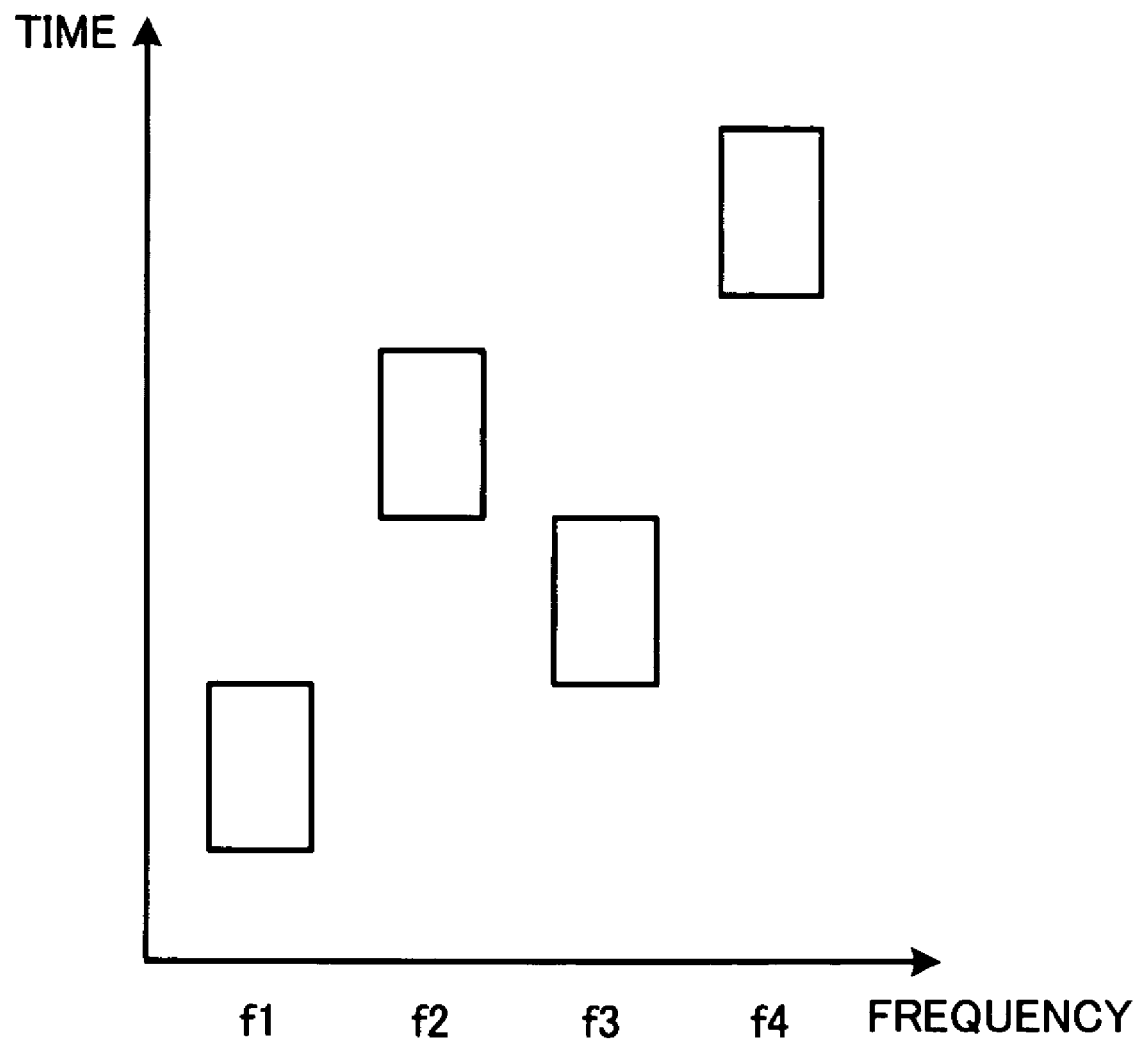
FIG. 5 illustrates scheduling during normal communication.

FIG. 5 illustrates scheduling during normal communication, wherein the horizontal axis indicates frequency bands allocated to terminals and the vertical axis indicates time.

The base station 11 successively allocates terminals frequency bands that have good wireless quality at that time. For example, as indicated by the rectangles in FIG. 5, the terminal 21 is successively allocated frequency bands f1, f3, f2 and f4 in that order. The frequency bands that are not allocated to the terminal 21 at each time point are allocated to other different terminals.

Figure 6:
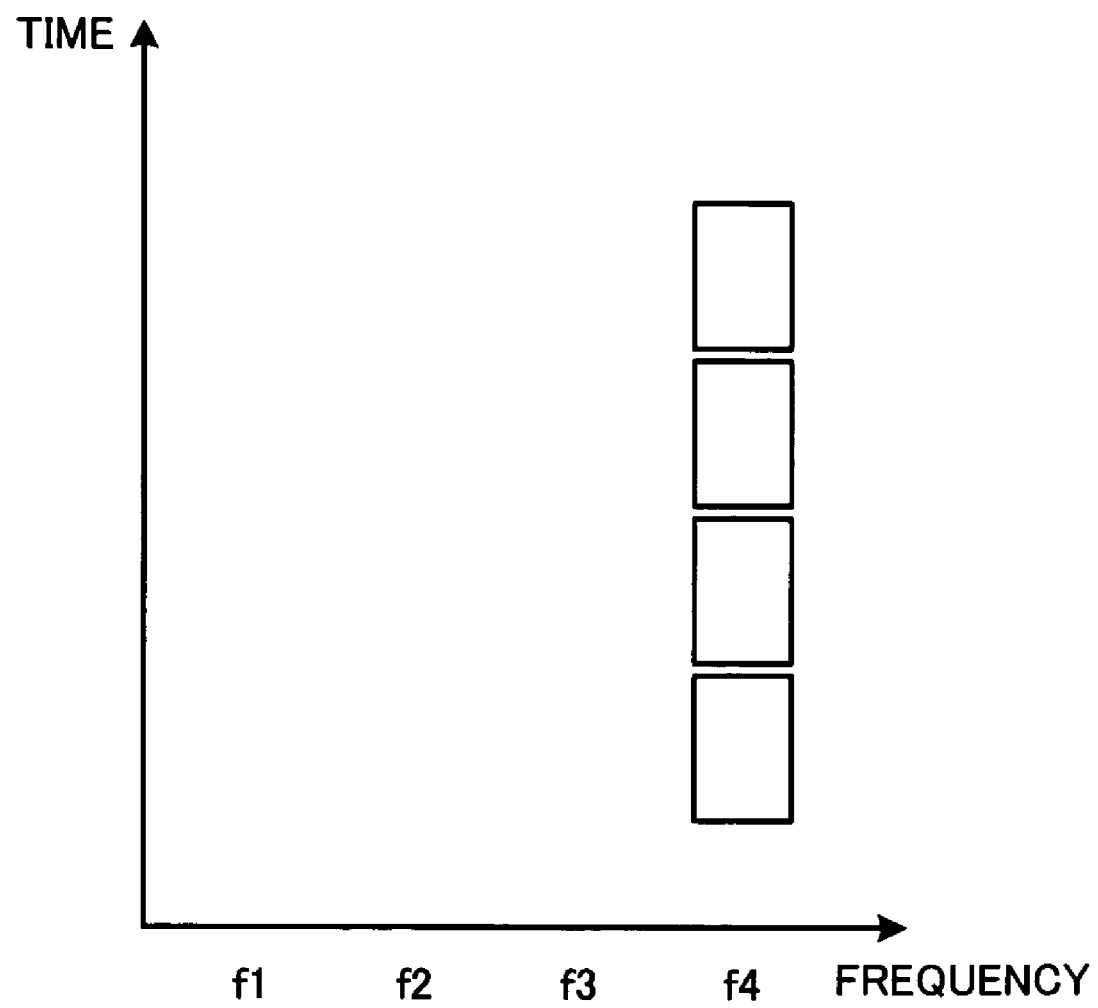
FIG. 6 illustrates scheduling for a handover.

FIG. 6 illustrates scheduling of the base station 11 receiving a handover request, wherein the horizontal axis indicates frequency bands allocated to terminals and the vertical axis indicates time.

Upon receiving the handover request from the terminal 21, the base station 11 increases the power of a frequency band f4, as shown in FIG. 4, and then allocates the frequency band f4 with the increased power to the requesting terminal 21. That is to say, only the frequency band f4 is allocated to the terminal 21 as indicated by the rectangles in FIG. 6.

Consequently, the base station 11 is allowed to transmit remaining packets to the terminal 21, which is roaming around the boundary between cells 31 and 32, using the frequency band with the increased power, resulting in improved transmission/reception throughput of those packets.

After transmitting all remaining packets to the terminal 21, the base station 11 returns to a normal process where power is equally distributed as shown in FIG. 3 and the terminal 21 is sequentially allocated different frequency bands f1 to f4 as shown in FIG. 5.

In the above example, the base station 11 starts to increase the power on receiving a handover request from the terminal 21. Alternatively, the base station 11 may initiate the power control when the Quality of Service (QoS) level of remaining packets for the terminal 21 exceeds a predetermined threshold after the reception of the handover request.

Figure 7:
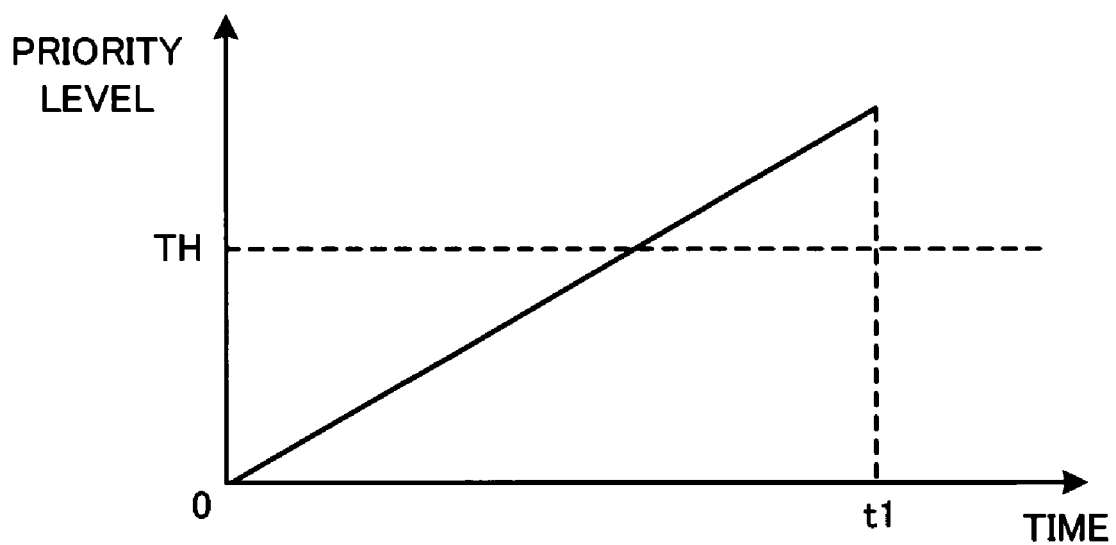
FIG. 7 illustrates a power control process according to QoS.

FIG. 7 is a graph illustrating such QoS-based power control process, wherein the horizontal axis indicates time and the vertical axis indicates the QoS level of remaining packets.

The base station 11 is designed to discard remaining packets for the terminal 21 after a lapse of a time t1 so that the packets may not remain in its memory unduly long. To avoid untransmitted packets from being discarded, the QoS level of remaining packets is increased, which is a trigger for a power control process.

For example, when the QoS level exceeds a threshold TH as shown in FIG. 7, the base station 11 increases the power level for frequency band f4 as shown in FIG. 4, and executes scheduling such that the frequency band f4 will be allocated to the terminal 21 as shown in FIG. 6.

The base station 11 may be capable of transmitting all of the remaining packets to the terminal 21 before the QoS level exceeds the threshold. If this is the case, the base station 11 does not perform the power control process, and the terminal 21 is not allocated a frequency band with increased power.

The functions of the base station 11 will now be described with reference to FIG. 8. As illustrated, the base station 11 includes a handover request receiver 11*a*, a QoS comparator 11*b*, a power controller 11*c*, and a scheduler 11*d*.

When a handover request arrives from a terminal 21, the handover request receiver 11*a* notifies the QoS comparator 11*b* of the reception of the request. The QoS comparator 11*b* compares the QoS level of remaining packets stored in memory with a threshold. When the QoS level is higher than the threshold, the QoS comparator 11*b* notifies the power controller 11*c* and the scheduler 11*d* that the QoS level of the remaining packets has exceeded the threshold.

The power controller 11*c* receiving this notification controls power levels for wireless communication with the terminal 21. For example, the power of frequency band f3 is allotted to frequency band f4, as shown in FIG. 4.

The scheduler 11*d* receiving the notification from the QoS comparator 11 allocates the frequency band with the increased power to the requesting terminal. For example, frequency band f4 is allocated to the terminal 21, as shown in FIG. 6.

With respect to terminals not requesting handover, the scheduler 11*d* performs normal scheduling according to adaptive modulation. Specifically, the scheduler 11*d* allocates the remaining frequency bands f1 to f3 to the terminals. If the power of frequency band f3 has been allotted in its entirety to frequency band f4, the scheduler 11*d* allocates other frequency bands f1 and f2 to the terminals.

Figure 8:
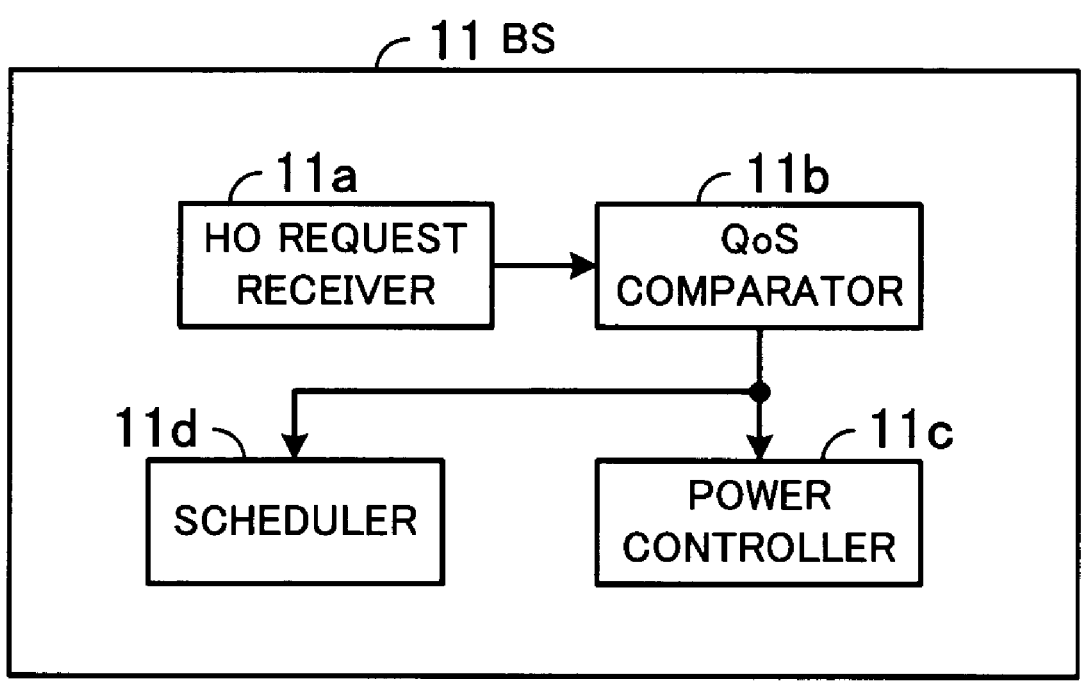
FIG. 8 is a functional block diagram of a base station.

The QoS comparator 11*b* of FIG. 8 can be omitted if the power control and the scheduling are desired to be initiated on reception of a handover request, irrespective QoS level. Further, the scheduler 11*d* may be designed to function also as the handover request receiver 11*a*, the QoS comparator 11*b* and the power controller 11*c*.

As described above, the terminal 21 roaming around the boundary between cells 31 and 32 is allocated a frequency band with increased power by the handover source base station 11. The terminal 21 can receive remaining packets at the increased power level, resulting in improved transmission/ reception throughput of the remaining packets. The improved throughput shortens time required for a handover.

The following describes how the base station 12 decreases a power level. By decreasing power of a frequency band used by a requesting terminal, the base station 12 reduces interference with transmission/reception of remaining packets, resulting in improved throughput of the remaining packets transmitted from the base station 11 to the terminal 21.

Figure 9:
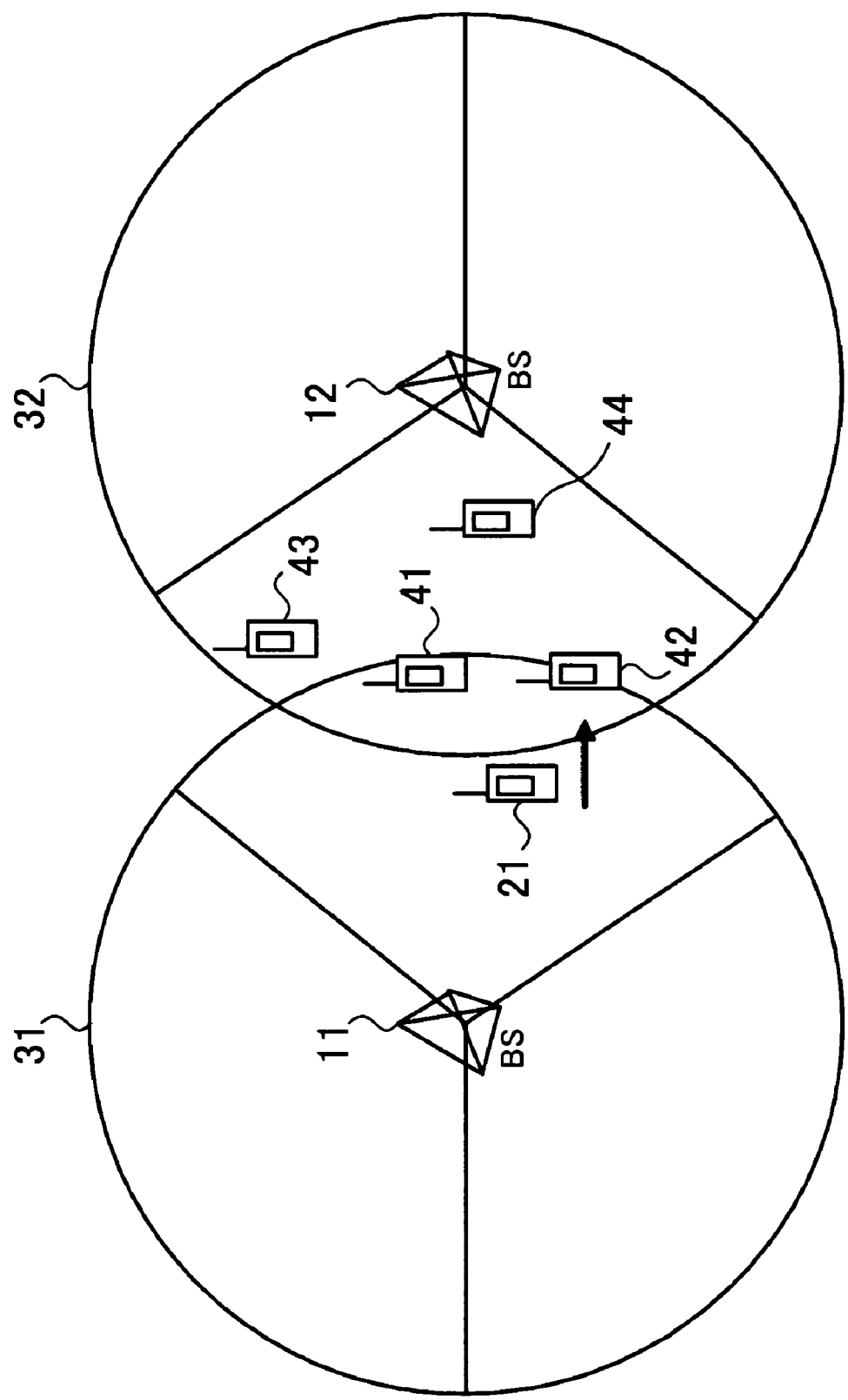
FIG. 9 shows an exemplary configuration of a mobile communication system.

FIG. 9 shows an exemplary configuration of the mobile communication system. In the figure, like reference numerals denote like elements appearing in FIG. 2, and description of such elements is omitted.

As illustrated, terminals 41 to 44 are located within a cell 32. It is assumed here that the terminals 41, 42, 43 and 44 are currently allocated frequency bands f4, f3, f2 and f1, respectively, and that the base station 11 has increased the power of frequency band f4 in response to a handover request from the terminal 21.

The terminal 41 at the boundary between cells 31 and 32 is communicating with the base station 12 using frequency band f4. The increased power interferes with this communication. Suppose that the base station 11 has doubled the power of the frequency band f4. The interference of power becomes twofold (+3 dB) and thus the CQI of the terminal 41 deteriorates by about −3 dB. The power increase does not affect CQIs of the other terminals 42 to 44 using different frequency bands f1 to f3.

Accordingly, the base station 12 can detect which frequency band the base station 11 has boosted, by monitoring wireless qualities of the terminals 41 to 44. Then the base station 12 decreases the power of the detected frequency band.

In the case where the base station 11 has increased the power of frequency band f4 by allotting the power of frequency band f3 to frequency band f4, as explained above with reference to FIG. 4, the power decrease for frequency band f3 reduces interference with communication at frequency band f3 in the adjacent cell, and the CQI of the terminal 42 improves.

Figure 10:
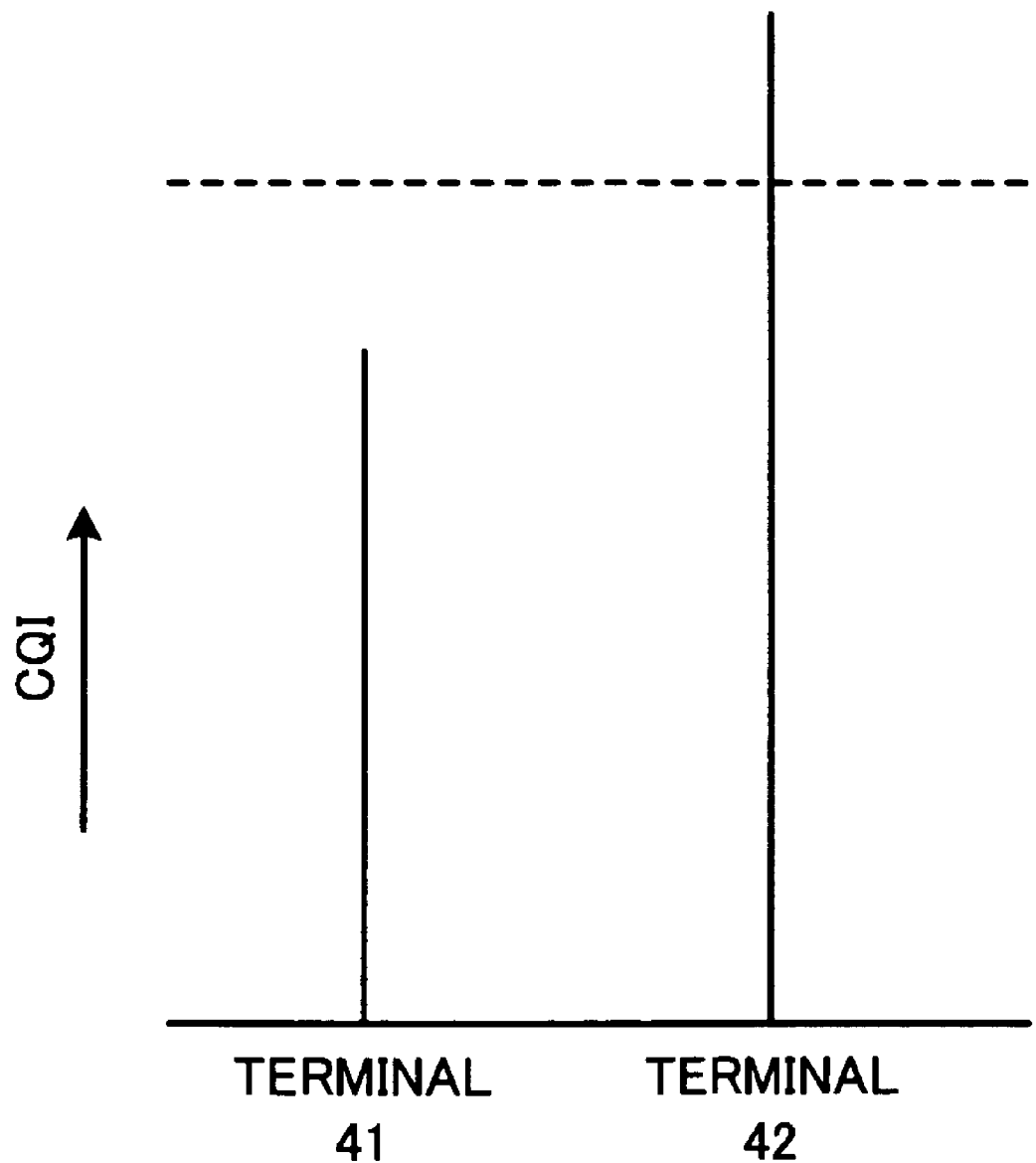
FIG. 10 shows CQIs of terminals communicating with a handover target base station.

FIG. 10 shows the CQIs of the terminals 41 and 42 communicating with a handover target base station 12. The terminals 41 to 44 each receives a common pilot from the base station 12 and calculates a Signal to Interference and Noise Ratio (SINR). Then, each of the terminals 41 to 44 converts the SINR, which is a continuous value, to a CQI, which is a discrete value, and transmits the CQI to the base station 12. For example, SINRs of 0 to 1 dB are converted to CQI "1", SINRs of 1 to 2 dB to CQI "2", and SINRs of 2 to 3 dB to CQI "3". Wireless quality elements other than SINR and CQI can be used, provided that the base station 12 can confirm the wireless qualities of the terminals 41 to 44.

In the case where the power of the frequency band f4 is increased in the base station 11 by allotting the power of frequency band f3 to frequency band f4, the CQI of the terminal 41 using frequency band f4 for communication decreases below a level indicated by the dashed line in FIG. 10, due to the interference from the cell of the base station 11. In the figure, the dashed line indicates the CQI of the terminal 41 before the power of the frequency band f4 is increased by the base station 11.

On the other hand, the CQI of the terminal 42 using frequency band f3 for communication increases above the level indicated by the dashed line in FIG. 10, because of the disappearance of the interference from the cell of the base station 11. In the figure, the dashed line indicates the CQI of the terminal 42 before the power of the frequency band f4 is increased by the base station 11.

CQIs of the terminals 41 to 44 are responsive to power changes made by the base station 11. Accordingly, the handover target base station 12 monitors CQIs of the terminals 41 to 44 to detect the frequency bands of which the power levels have been changed by the handover source base station 11. The handover target base station 12 decreases the power of a frequency band of a decreased CQI.

Figure 11:
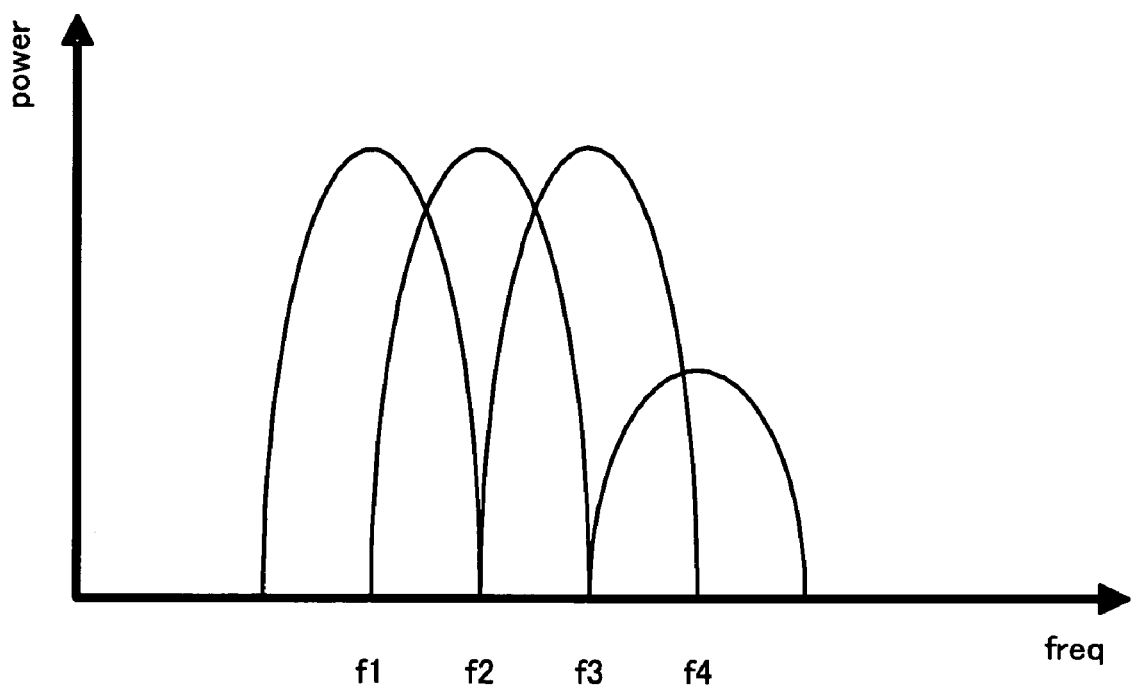
FIGS. 11 and 12 show power levels of a handover target the base station.

FIG. 11 is a graph showing power levels of a handover target base station that has received a handover request, wherein the horizontal axis indicates frequency bands and the vertical axis indicates transmission power levels.

On detecting a frequency band of which power has been increased by the handover source base station 11, the handover target base station 12 decreases the power of the detected frequency band. Suppose that power of frequency band f4 has been increased by the handover source base station 11. In this case, the handover target base station 12 decreases the power of frequency band f4, as shown in FIG. 11. This reduces the inter-cell interference of frequency band f4, whereby the handover source base station 11 can transmit remaining packets to the terminal 21 using frequency band f4 with enhanced throughput.

Figure 12:
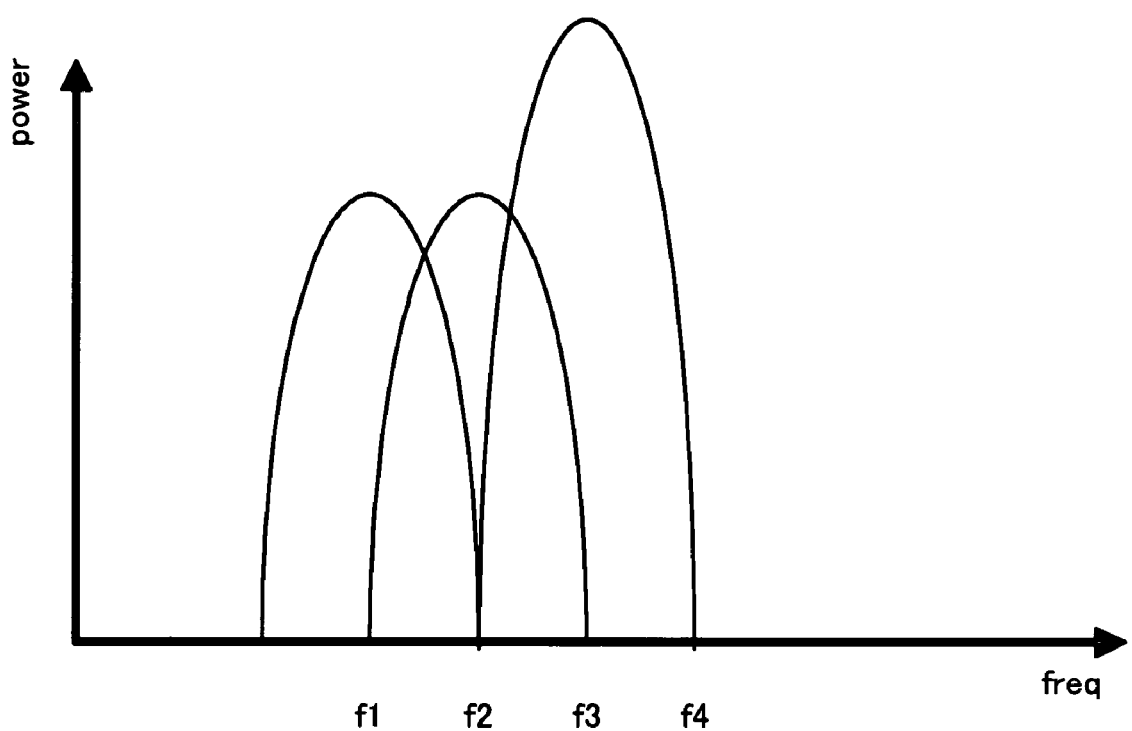

FIG. 12 is another graph showing power levels of a handover target base station that has received a handover request, wherein the horizontal axis indicates frequency bands and the vertical axis indicates transmission power levels.

In the example shown in FIG. 11, the power of frequency band f4 is merely decreased; in the example shown in FIG. 12, the decreased power is allotted to another frequency band, for example, frequency band f3 whose CQI is intended to increase. This improves throughput of packets exchanged between the base station 12 and the terminal 42.

When a handover request is received, the handover source base station 11 increases power for transmitting a common pilot as well as power for a specific frequency band for transmitting packets (communication data). On the other hand, the handover target base station 12 decreases only the specific frequency band for transmitting packets, while holding the common pilot transmission power.

Figure 13:
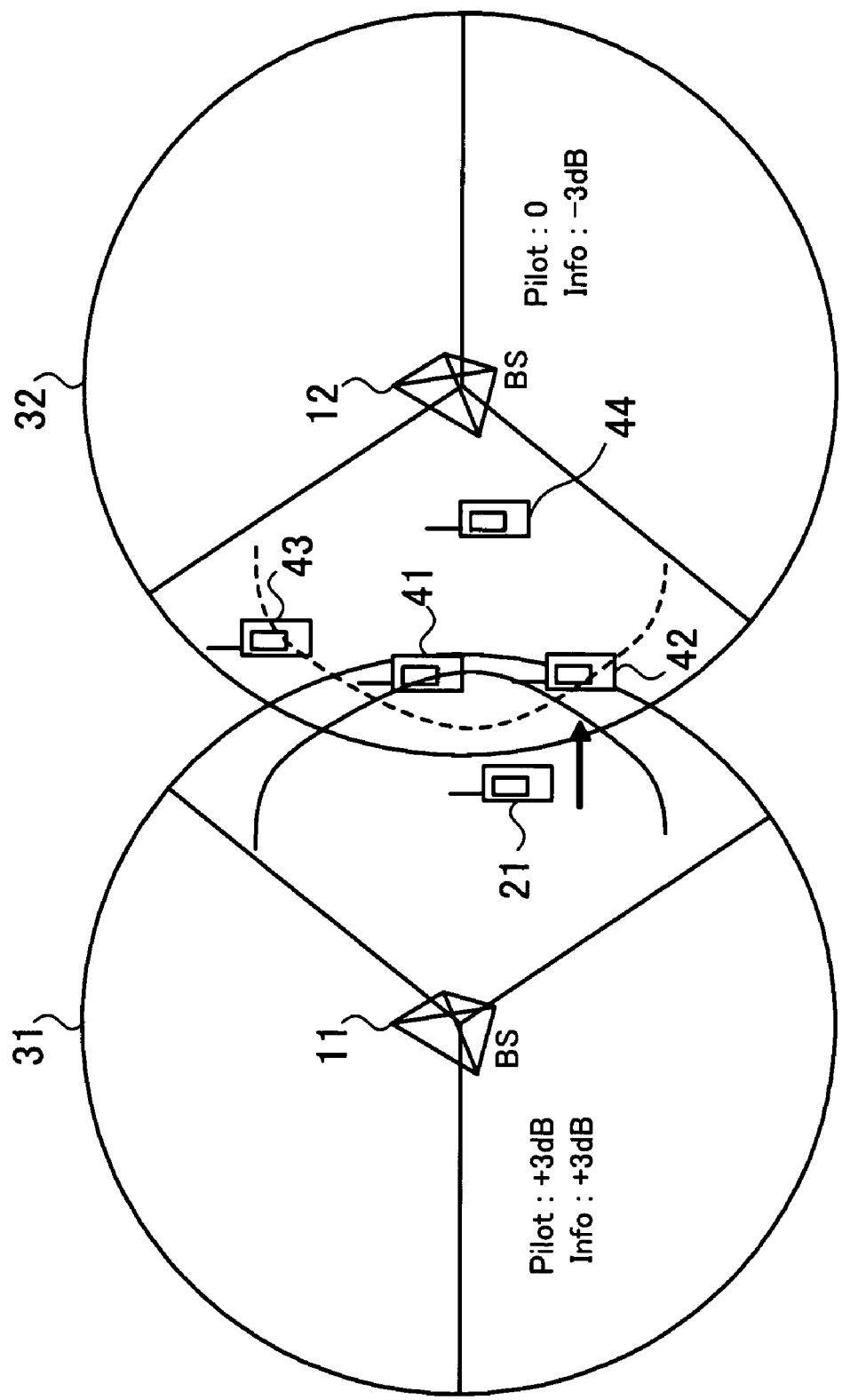
FIG. 13 illustrates power levels of the handover source base station and output power levels of the handover target base station.

FIG. 13 illustrates power levels of a handover source base station, and power levels of a handover target base station. In FIG. 13, like reference numerals denote like elements appearing in FIG. 9, and description of such elements is omitted. "Pilot" and "Info" written in the cells 31 and 32 indicate how much common pilot transmission power and packet transmission power are changed.

When a handover request is received, the handover source base station 11 increases the common pilot transmission power by +3 dB and also increases the power of the frequency band f4 for transmitting packets by +3 dB. On the other hand, the handover target base station 12 keeps the common pilot transmission power (0 dB) unchanged and decreases, by −3 dB, the power of frequency band f4 for transmitting packets.

Since the base station 11 increases the common pilot transmission power by +3 dB, the terminal 21 returns, to the base station 11, its CQI enhanced by +3 dB. This enables the base station 11 to increase the amount of data that can be exchanged at a time with the terminal 21. Also, since the packet transmission power is increased by +3 dB, it is possible to reduce packet errors caused due to inter-cell interference.

Moreover, the handover target base station 12 decreases the packet transmission power by −3 dB, and therefore, the inter-cell interference of frequency band f4 can be further reduced, making it possible to further reduce packet errors. Also, packet errors due to CQI delay can be reduced.

Figure 14:
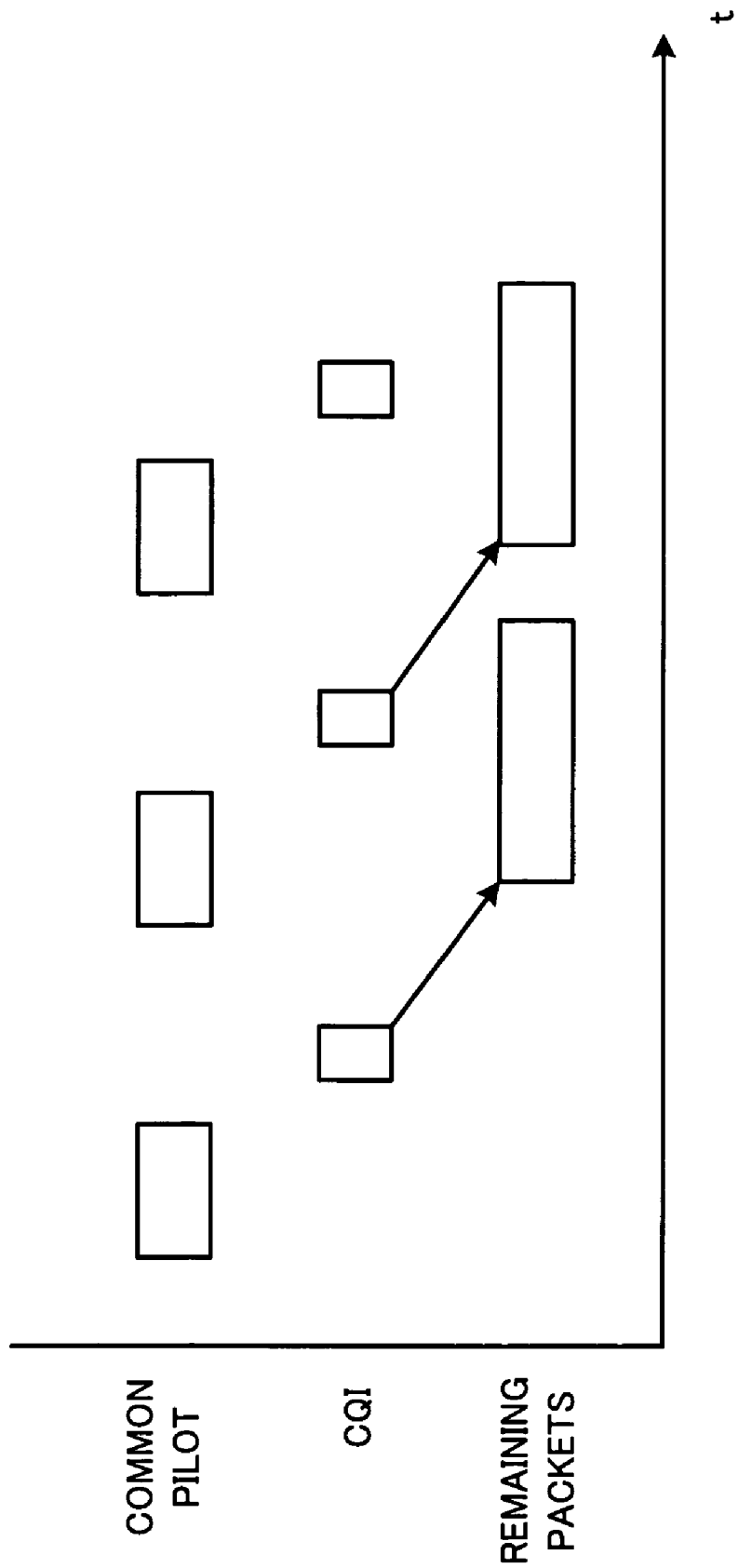
FIG. 14 illustrates CQI delay.

FIG. 14 illustrates CQI delay, wherein the horizontal axis indicates time. The base station 11 outputs a common pilot as shown in this figure, and the terminal 21 receives the common pilot from the base station 11, calculates and transmits a CQI to the base station 11 at the illustrated timing. In accordance with the received CQI, the base station 11 transmits remaining packets.

As indicated by the arrows in FIG. 14, there is a time lag between transmission of remaining packets and the calculation of CQI. Accordingly, the transmitted CQI does not exactly indicate the signal quality at the time of transmitting remaining packets. The terminal 21 may therefore experience packet errors.

By decreasing the packet transmission power by −3 dB in the handover target base station 12, the packet errors can be reduced irrespective of CQI delays. The handover target base station 12 does not increase the common pilot transmission power, in order that the common pilot of the base station 12 may not adversely affect the measurement of CQI of the base station 11 by the terminal 21.

Figure 15:
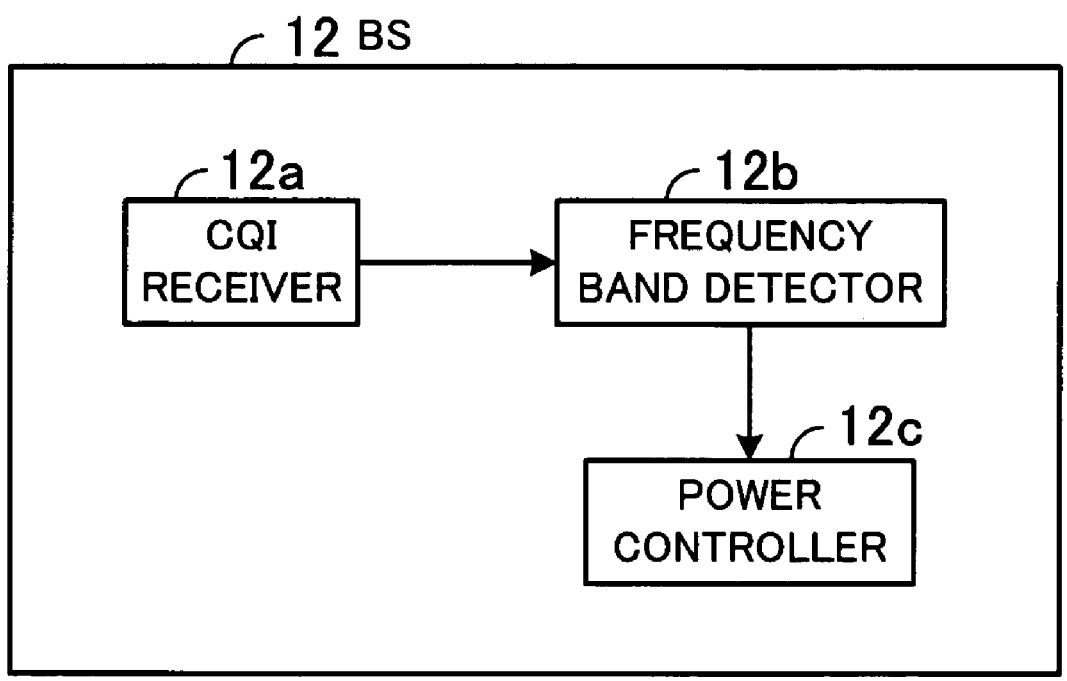
FIG. 15 is a functional block diagram of the base station.

The following describes the functions of the handover target base station 12 with reference to FIG. 15.

As illustrated, the base station 12 includes a CQI receiver 12a, a frequency band detector 12b, and a power controller 12c. The CQI receiver 12a receives CQIs from terminals 41 to 44 located in a cell 32. Based on the received CQIs, the frequency band detector 12b detects the frequency bands of which power levels have been changed by the handover source base station 11.

The power controller 12c controls power levels for the detected frequency bands. For example, the power controller 12c decreases the power of frequency band f4, which has been increased by the handover source base station 11, and increases the power of frequency band f3, which has been decreased by the base station 11, as shown in FIGS. 11 and 12. The power controller 12c keeps the common pilot transmission power unchanged and increases/decreases only the packet transmission power. The base station 12 initiates this process when receiving a handover request from the base station 11, and terminates it when receiving a packet send request from the terminal 21.

Although not shown, a scheduler for adaptive modulation performs scheduling in accordance with CQIs from the terminals 41 to 44, to allocate frequency bands f1 to f4 to the terminals 41 to 44. The scheduler may be designed to function also as the CQI receiver 12a, the frequency band detector 12b and the power controller 12c.

The schedulers of the base stations 11 and 12 each determine Modulation and Coding Scheme (MCS) for the adaptive modulation in accordance with CQIs received from individual terminals. The MCS is a value that associates modulation and coding scheme with CQI. For example, an MCS value of "1" is associated with Quadrature Phase Shift Keying (QPSK) modulation and R=1/3 coding and with CQIs "0" to "3". MCS "2" is associated with QPSK modulation and R=1/2 coding and with CQIs "4" to "6". MCS "10" is associated with 16 Quadrature Amplitude Modulation (QAM) and R=8/9 coding and with CQIs "30" to "35". Accordingly, the CQI value determines MCS and the modulation scheme for wireless communication.

Decrease of packet transmission power in the handover target base station 12 can reduce packet errors, which results in a reduced need for packet retransmission and enables high-speed transmission of packets.

Figure 16:
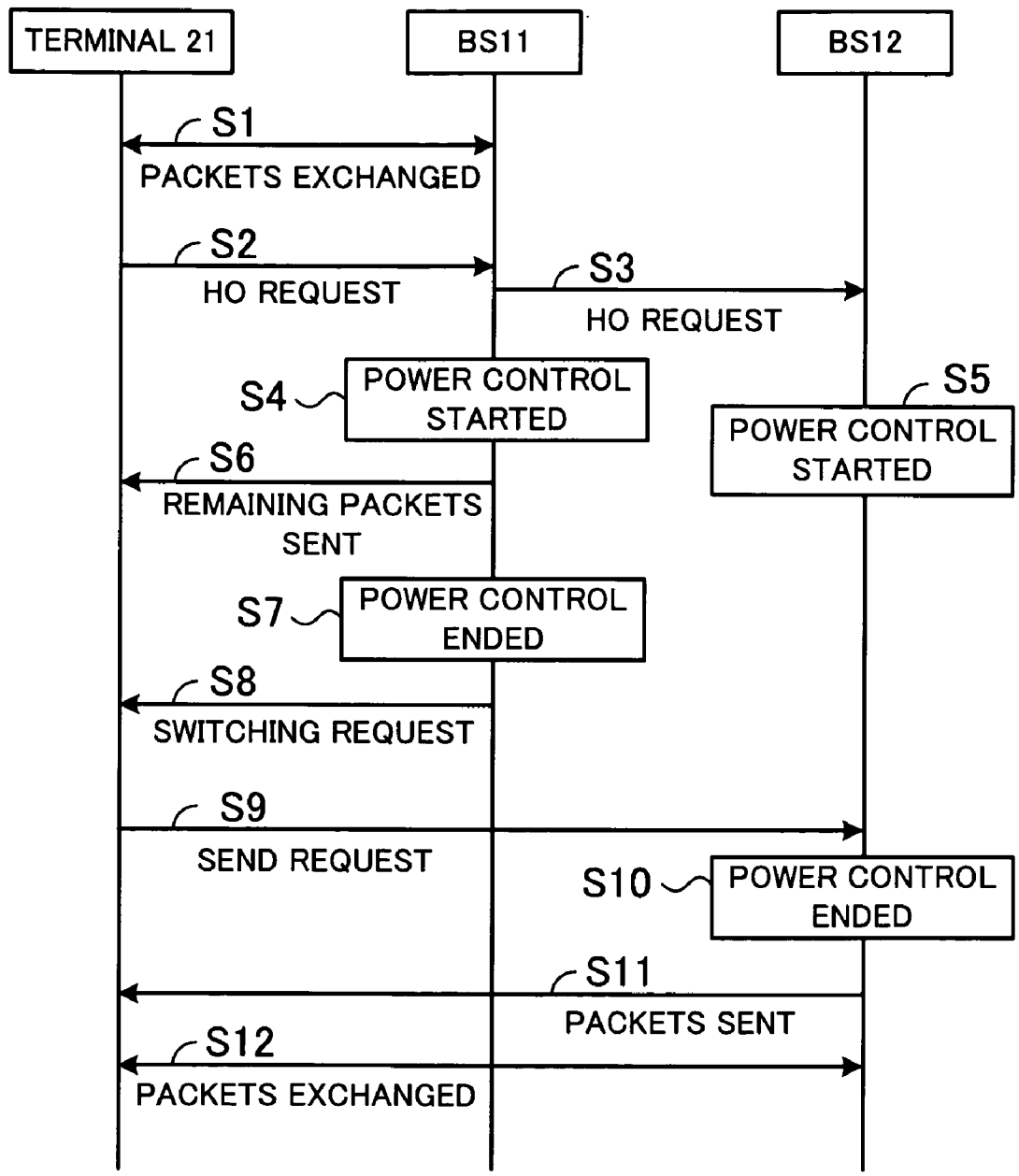
FIG. 16 shows an operation sequence of the mobile communication system.

FIG. 16 illustrates an operation sequence of the mobile communication system including the handover source base station 11, the handover target base station 12, and the terminal 21 shown in FIGS. 2, 9 and 13.

Step S1: The terminal 21 being in the cell 31 of the base station 11 exchanges packets with the base station 11 in a usual way without power control.

Step S2: The terminal 21 moves toward a neighboring cell 32, so that the received power level from the base station 12 becomes higher than that from the base station 11, then the terminal 21 sends a handover request to the base station 11.

Step S3: The base station 11 transfers the received handover request to the base station 12.

Step S4: On receiving the handover request from the terminal 21, the base station 11 starts a power control process. For example, the base station 11 increases the power of frequency band f4 by allotting the power of frequency band f3 to the frequency band f4, as shown in FIG. 4. Then, the base station 11 allocates frequency band f4 with the increased power to the requesting terminal 21.

Alternatively, the base station 11 may initiate a power control process when QoS of remaining packets for the terminal 21 exceeds a predetermined threshold after the reception of a handover request from the terminal 21, as mentioned earlier.

Step S5: On receiving the handover request from the terminal 21, the base station 12 starts a power control process. For example, the base station 12 receives CQIs from the terminals 41 to 44 located in the cell 32 and based on the received CQIs, detects the frequency band whose power has been increased by the handover source base station 11. Then, the base station 12 decreases the power of the detected frequency band.

Step S6: The base station 11 transmits, to the terminal 21, the remaining packets.

Step S7: When all of the remaining packets are transmitted to the terminal 21, the base station 11 terminates its power control process. Specifically, the base station 11 equally distributes power among the frequency bands, as shown in FIG. 3.

Step S8: The base station 11 sends a handover switching request to the terminal 21.

Step S9: The terminal 21 sends a packet send request to the handover target base station 12.

Step S10: The base station 12 terminates its power control process. Specifically, the base station 12 equally distributes power among the frequency bands.

Step S11: The base station 12 starts to communicate with the requesting terminal 21. Specifically, the base station 12 transmits, to the terminal 21, accumulated packets, which have been already received from the core network (not shown).

Step S12: The terminal 21 and the base station 12 exchange packets in a usual way.

The handover request is made from a terminal in the above example, but such a request may be made from a base station. For example, the base station 11 outputs a handover request to a handover target base station 12 depending on wireless quality information received from the terminal 21. In this case, the base station 11 initiates a power control process.

The terminal 21 and the base station 12 may establish a wireless connection at any time after the handover request is made in Step S2, but preferably before a handover switching request is made in Step S8.

Figure 17:
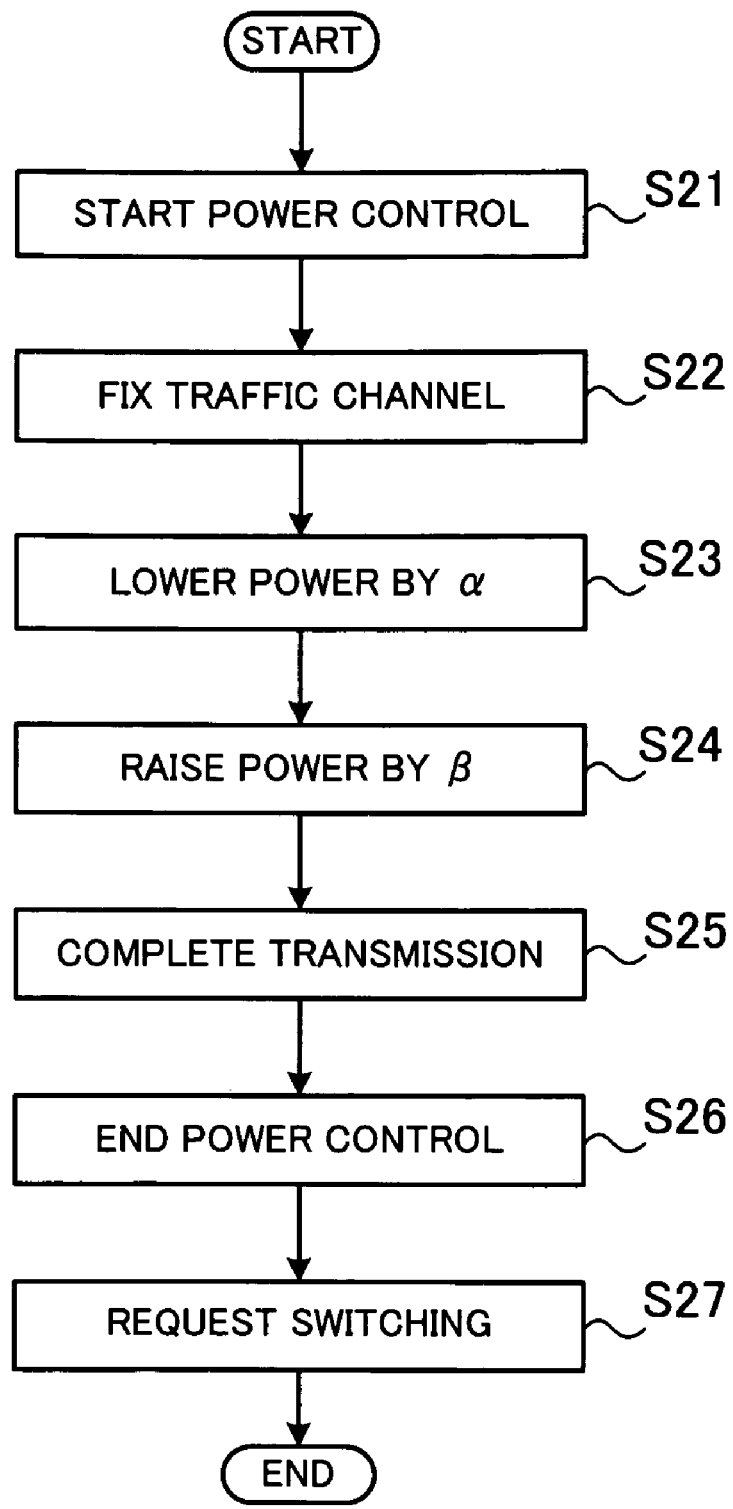
FIG. 17 is a flowchart showing a process executed by the handover source base station.

The power control operation of the handover source base station 11 will be now described with reference to the flowchart of FIG. 17.

Step S21: On receiving a handover request from the terminal 21, the base station 11 starts a power control process.

Step S22: The base station 11 fixes a traffic channel of the requesting terminal 21. The traffic channel is an orthogonal channel that the scheduler allocates to terminals by partitioning resources such as frequency band, space and code. The foregoing description has assumed frequency bands as a typical example of traffic channels.

A high-performance terminal can monitor all traffic channels, i.e., frequency bands f1 to f4 shown in FIG. 3. Suppose that the traffic channel (frequency band) f4 carries the handover request from the terminal 21. The base station 11 fixes the traffic channel f4 for use by the terminal 21. The other traffic channels f1 to f3 are referred to as unfixed traffic channels.

Step S23: The base station 11 lowers by $\alpha$ the power of an unfixed traffic channel, for example, f3.

Step S24: The base station 11 increases by $\beta$ the power of the traffic channel, i.e., f4 of the terminal 21.

Step S25: The base station 11 transmits all remaining packets to the terminal 21.

Step S26: On completing the transmission of the remaining packets, the base station 11 terminates its power control process.

Step S27: The base station 11 outputs a handover switching request to the terminal 21.

The aforementioned values $\alpha$ and $\beta$ bear the relationship $\alpha - \beta \geq 0$ in order that the output power amplifier may not be saturated.

Figure 18:
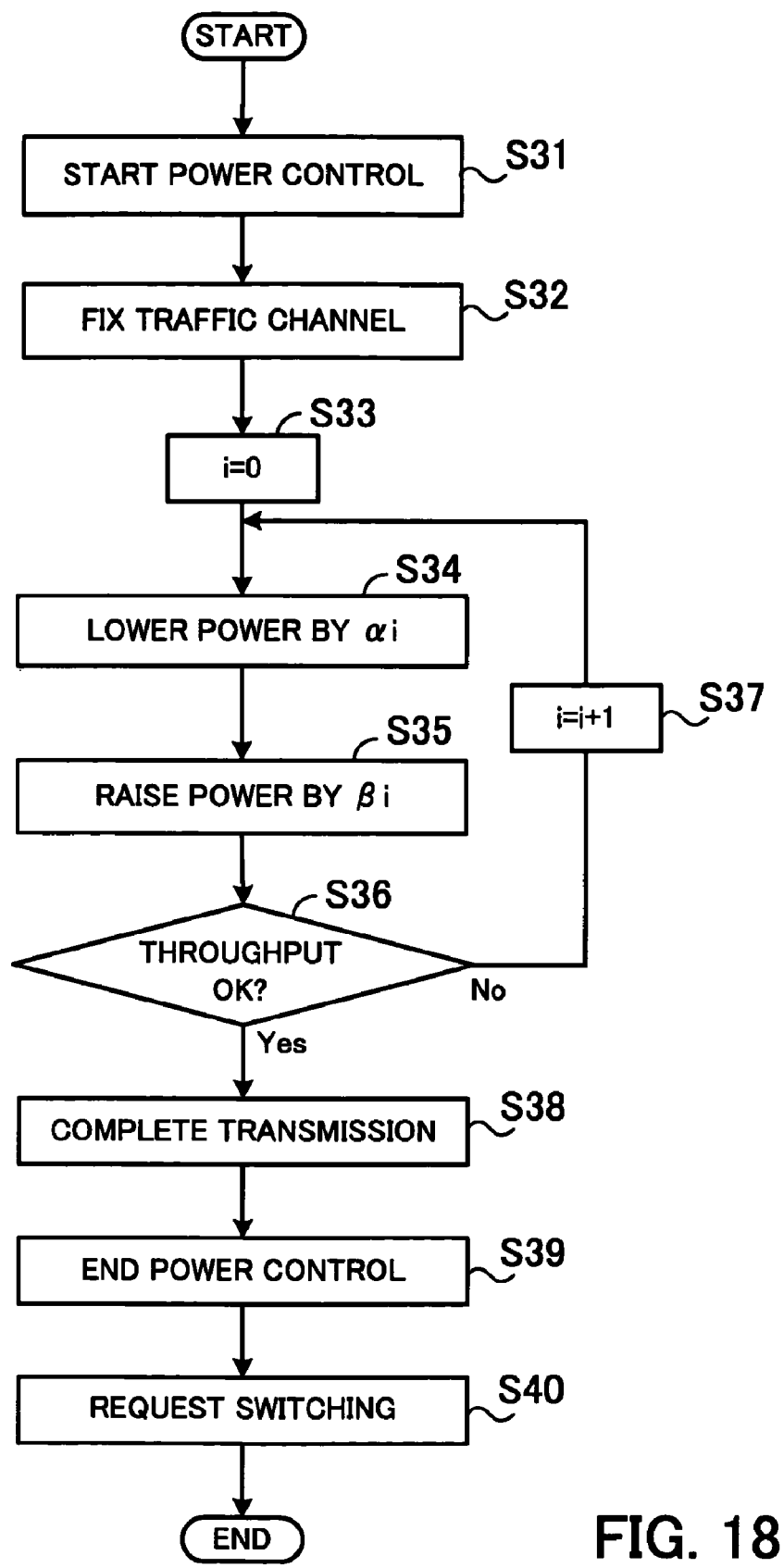
FIG. 18 is a flowchart showing another process executed by the handover source base station.

Another power control action of the handover source base station 11 will now be described with reference to the flowchart of FIG. 18. In this power control, the base station 11 monitors throughput of remaining packets to be transmitted to the terminal 21 and controls power in order to obtain sufficient throughput.

Step S31: On receiving a handover request from the terminal 21, the base station 11 starts a power control process.

Step S32: The base station 11 fixes the traffic channel, for example, f4, of the requesting terminal 21.

Step S33: The base station 11 initializes a variable i to "0".

Step S34: The base station 11 lowers by $\alpha i$ the power of an unfixed traffic channel, for example, f3. The value $\alpha i$ increases with i; namely, the relationship $\alpha i+1 > \alpha i$ holds.

Step S35: The base station 11 increases by $\beta i$ the power of the traffic channel, f4 of the terminal 21. The value $\beta i$ increases with i; namely, the relationship $\beta i+1 > \beta i$ holds.

Step S36: The base station 11 observes the throughput of remaining packets. Then, the base station 11 compares the detected throughput with a threshold, and if the detected throughput is acceptable, the flow proceeds to Step S38. Otherwise, the flow proceeds to Step S37.

Step S37: The base station 11 increments the variable i by "1".

Step S38: The base station 11 transmits all the remaining packets to the terminal 21.

Step S39: On completing the transmission of the remaining packets, the base station 11 terminates its power control process.

Step S40: The base station 11 outputs a handover switching request to the terminal 21.

Figure 19:
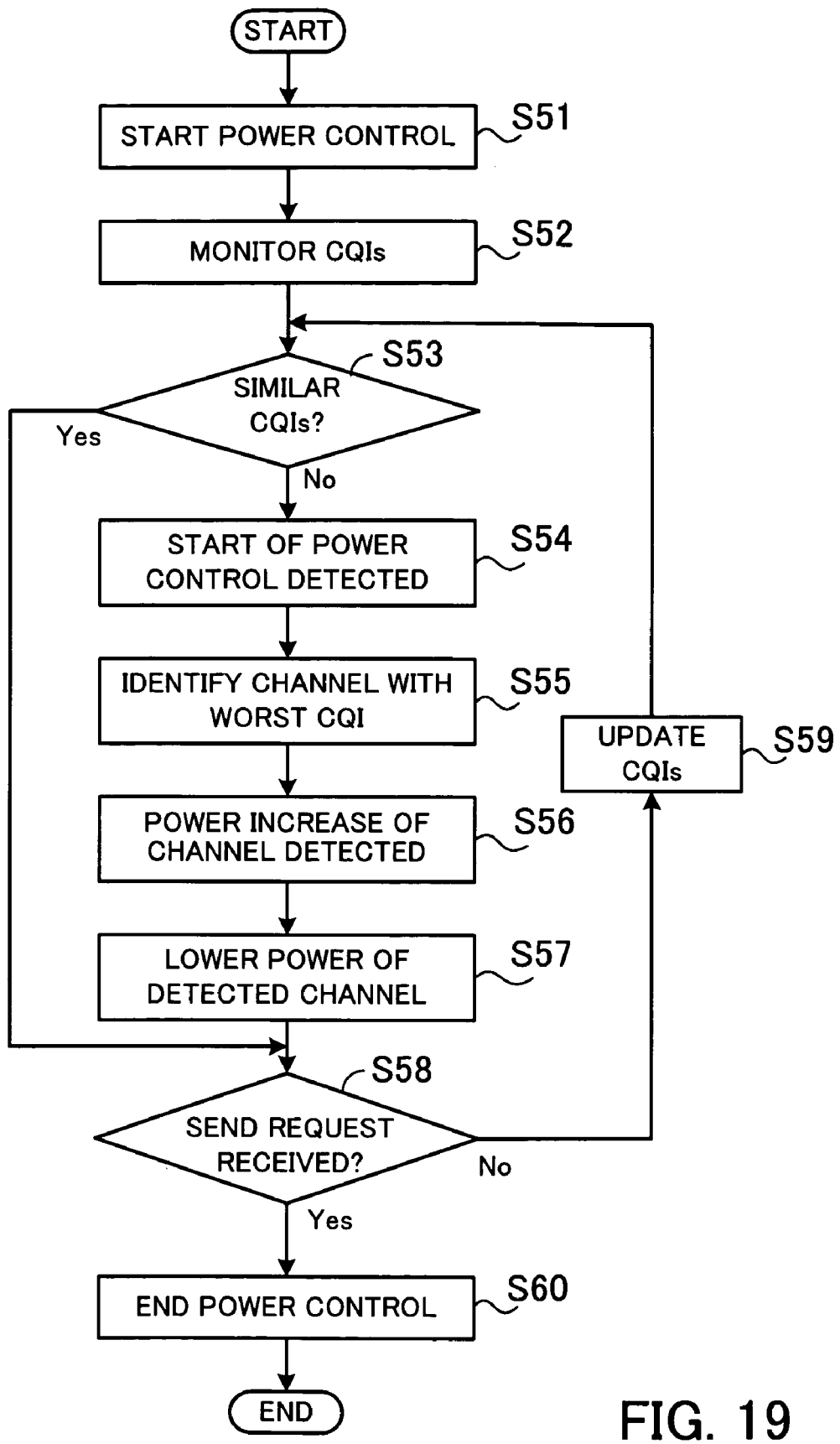
FIG. 19 is a flowchart showing a process executed by the handover target base station.

The power control action of the handover target base station 12 will now be described with reference to the flowchart of FIG. 19.

Step S51: On receiving a handover request from the handover source base station 11, the base station 12 initiates a power control process.

Step S52: The base station 12 monitors CQIs of individual traffic channels f1 to f4, which are received from the terminals 41 to 44 located in the cell 32.

Step S53: The base station 12 determines whether or not a difference in CQI between traffic channels is small enough to be acceptable. If the CQI difference is acceptable, the flow proceeds to Step S58; if not, the flow proceeds to Step S54. In this connection, when the handover source base station 11 is executing its own power control process, the CQI difference becomes big, which leads the base station 12 to Step S54.

Step S54: The base station 12 determines that the handover source base station 11 has started a power control process.

Step S55: The base station 12 identifies a traffic channel experiencing the worst CQI. If the handover source base station 11 has increased the power of the traffic channel f4, the base station 12 determines the traffic channel f4.

Step S56: The base station 12 confirms that the handover source base station 11 has increased the power of the traffic channel detected in the preceding step.

Step S57: The base station 12 lowers data (packet) transmission power of the detected traffic channel.

Step S58: The base station 12 determines whether or not a packet send request has arrived from the terminal 21. In this connection, the terminal 21 makes a packet send request after receiving all remaining packets from the handover source base station 11. If the send request has arrived, the flow proceeds to Step S60; if not, the flow proceeds to Step S59.

Step S59: The base station 12 updates the current values of CQIs with new CQIs received from the terminals 41 to 44.

Step S60: The base station 12 terminates its power control process.

Figure 20:
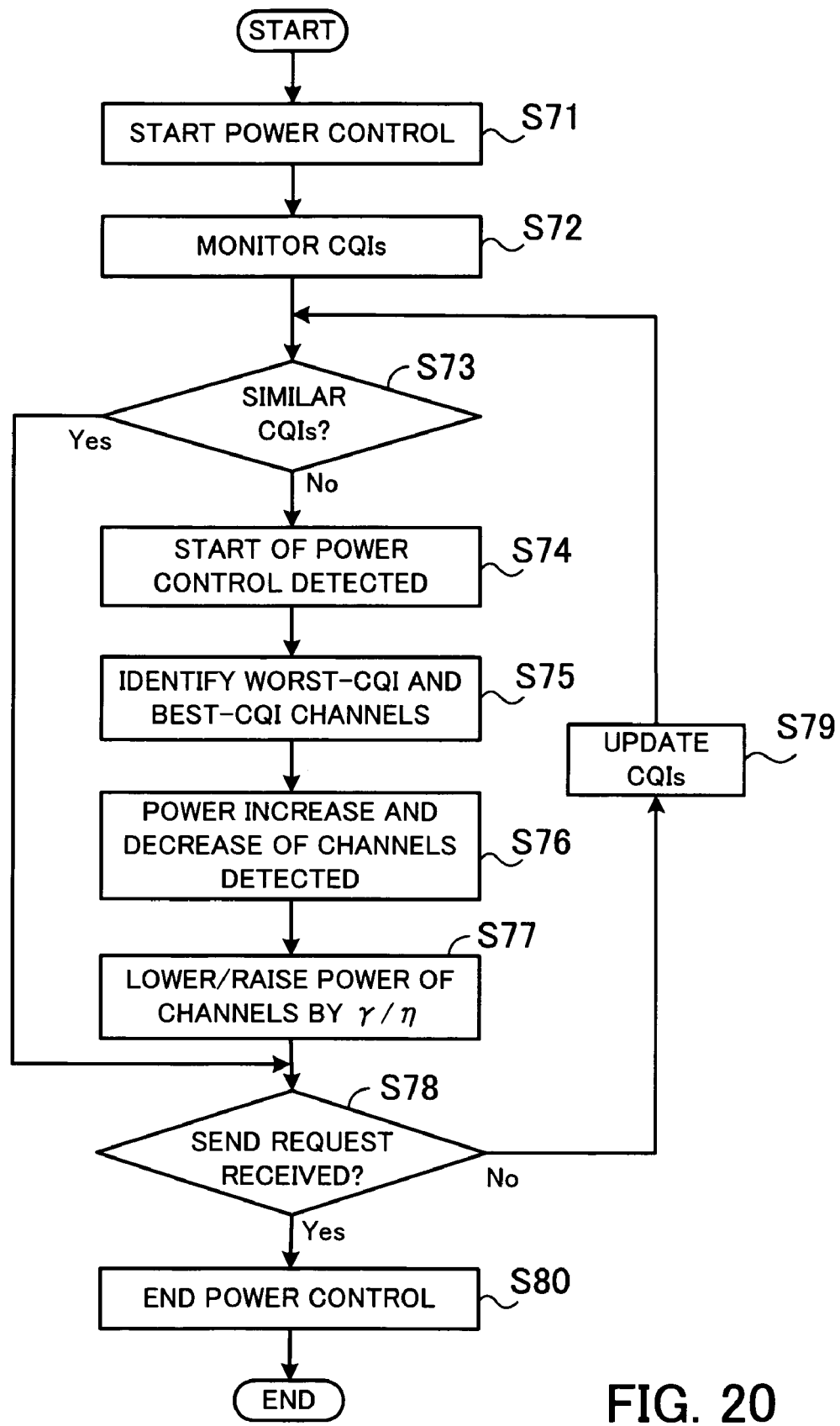
FIG. 20 is a flowchart showing another process executed by the handover target base station.

Another power control action of the handover target base station 12 will be now described with reference to the flowchart of FIG. 20. According to the control action of FIG. 19, the target base station 12 finds a traffic channel with the worst CQI and decreases the power of that traffic channel. In accordance with the control action shown in FIG. 20, a traffic channel with the best CQI is also detected and the power of that channel is increased.

Step S71: On receiving a handover request from the handover source base station 11, the base station 12 initiates a power control process.

Step S72: The base station 12 monitors CQIs of individual traffic channels f1 to f4, which are received from the terminals 41 to 44 located in the cell 32.

Step S73: The base station 12 determines whether or not a difference in CQI between traffic channels is small enough to be acceptable. If the CQI difference is acceptable, the flow proceeds to Step S78; if not, the flow proceeds to Step S74. In this connection, when the handover source base station 11 is executing its own control process, the CQI difference becomes big, which leads the base station 12 to Step S74.

Step S74: The base station 12 determines that the handover source base station 11 has started a power control process.

Step S75: The base station 12 identifies a worst-CQI traffic channel and a best-CQI traffic channel. If the handover source base station 11 allots the power of traffic channel f3 to traffic channel f4, the base station 12 will identify traffic channel f4 as a worst-CQI channel and traffic channel f3 as a best CQI channel for base station 12.

Step S76: The base station 12 determines that the handover source base station 11 has changed the power levels for the traffic channels detected in the preceding step. For example, the base station 12 determines that the base station 11 has increased the power of traffic channel f4 and has decreased the power of traffic channel f3.

Step S77: The base station 12 lowers data transmission power of the detected worst-CQI traffic channel by $\gamma$. Also, the base station 12 increases data transmission power of the detected best-CQI traffic channel by $\eta$.

Step S78: The base station 12 determines whether or not a packet send request has arrived from the terminal 21. In this connection, the terminal 21 sends a packet send request after receiving all remaining packets from the handover source base station 11. If the send request has arrived, the flow proceeds to Step S80; if not, the flow proceeds to Step S79.

Step S79: The base station 12 updates the current values of CQIs with new CQIs received from the terminals 41 to 44.

Step S80: The base station 12 terminates its power control process.

The aforementioned values $\gamma$ and $\eta$ bear the relationship $\gamma - \eta \geq 0$ ($\gamma > 0$, $\eta > 0$) in order that the output power amplifier will not be saturated.

As described above, the terminal 21 roaming around the boundary between cells 31 and 32 is allocated a traffic channel with increased power by the handover source base station 11 and the same traffic channel with decreased power by the handover target base station 11. This control reduces inter-cell interference and thus improves transmission/reception throughput of remaining packets.

In conventional systems, the throughput drops due to inter-cell interference, requiring a long time to complete a handover. To obviate the inconvenience, a handover to a base station providing a higher power level would be forcibly performed before every remaining packet is transmitted. However, the consequent packet loss results in retransmission of the remaining packets. Although the retransmission is performed via the network without fail, for example, at the upper TCP layer, the packets are significantly delayed.

According to the present invention, by contrast, the base stations 11 and 12 each perform power control to reduce the inter-cell interference, whereby the throughput of remaining packets improves. Consequently, the time needed for a handover can be shortened, and also all the remaining packets can be transmitted to the terminal 21 before its connection is handed over to the base station 12 providing a higher power level.

The following explains in detail how the base station 12 monitors CQIs.

Figure 21:
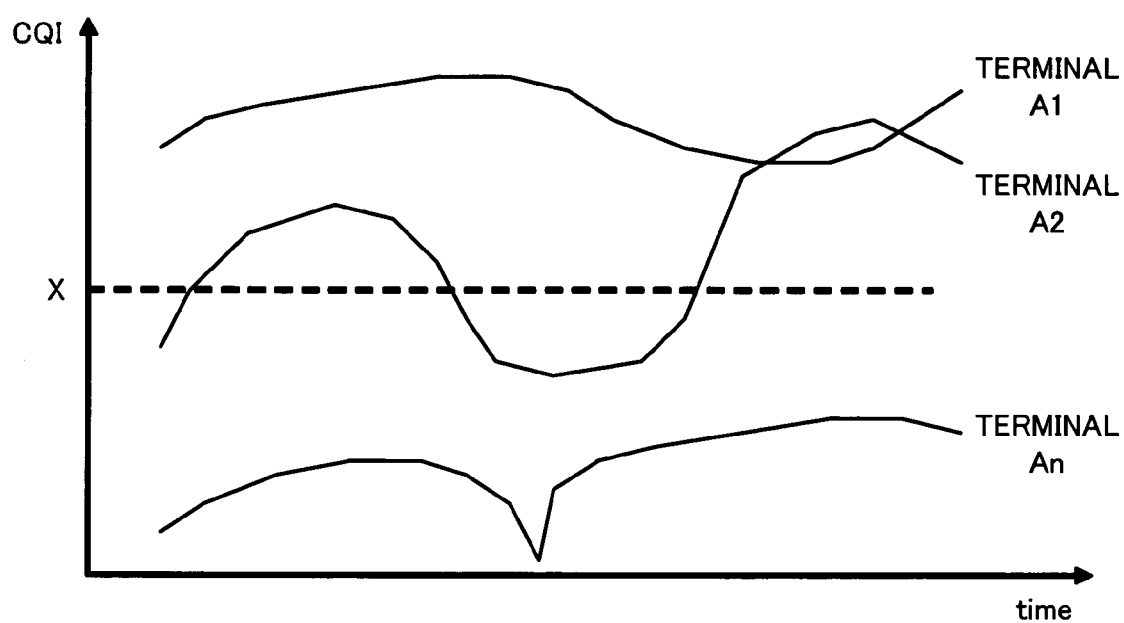
FIG. 21 shows changes of CQIs with time.

FIG. 21 shows changes of CQIs with time. In this figure, the CQIs received from terminals A1, A2, . . . , An are plotted with respect to a certain traffic channel. On receiving a handover request from the handover source base station 11, the base station 12 starts a power control process. Then, the base station 12 calculates a mean value X of CQIs with respect to each traffic channel, according to the following equation (1):

$$X(t, fi) = \frac{1}{K(fi)} \sum_{n=1}^{K(fi)} CQI(n, fi) \quad (1)$$

In equation (1), t represents time, fi represents the i-th frequency band, K(fi) represents the number of terminals using frequency band fi, and CQI(n, fi) represents the CQI (logarithmic dimension) of a terminal n using frequency band fi.

The mean value X(t, fi) indicates the average CQI of all terminals in the logarithmic scale. In FIG. 21, X indicates the mean value X obtained as the average CQI of the terminals shown in this figure.

Assume that the handover source base station 11 equally distributes power, as shown in FIG. 3, and that the terminals to which frequency bands are allocated are randomly yet uniformly exist within the cell 32 of the handover target base station 12. In this case, as more terminals exist, the mean values X obtained according to equation (1) will converge to an identical value, irrespective of traffic channels.

In cellular communications, a base station accommodates a large number of terminals. Thus, where the handover source base station 11 equally distributes transmission power among all traffic channels, the following relationship (2) holds true for every j (where i≠j):

$$X(t, fi) \approx X(t, fj) \quad (2)$$

Namely, the expression (2) signifies that differences in X between the traffic channels are smaller than a predetermined value (threshold THp). If this is the case, the following expression (3) gives the answer "NO (FALSE)":

$$YESorNO = \arg_{\forall j} if\, [|X(t, fi) - X(t, fj)| > THp] \quad (3)$$

The following explains the case where the handover source base station 11 performs power control by allotting the power of traffic channel f3 to traffic channel f4.

Figure 22:
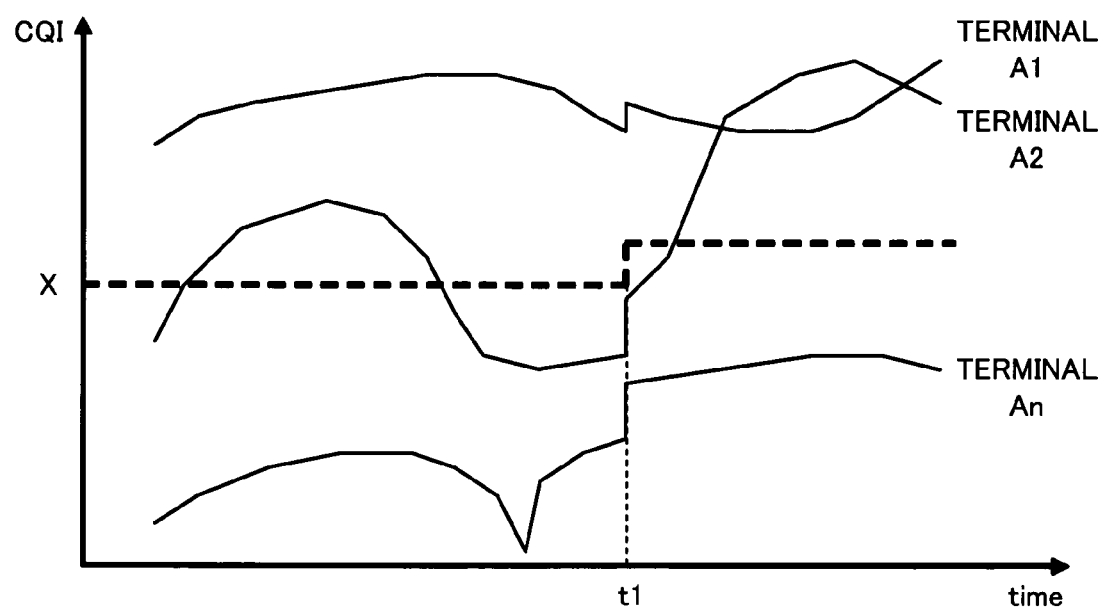
FIG. 22 shows temporal changes of CQIs with respect to a traffic channel f3.

FIG. 22 shows temporal changes of CQIs with respect to traffic channel f3. Suppose that, at time t1, the handover source base station 11 decreases the power of traffic channel f3. In this case, the terminals A1, A2, . . . , An located inside the cell 32 of the base station 12 enjoy improved SINR because the radio interference of the traffic channel f3 lessens. The resulting high CQIs raise the mean value X at time t1 as illustrated.

Figure 23:
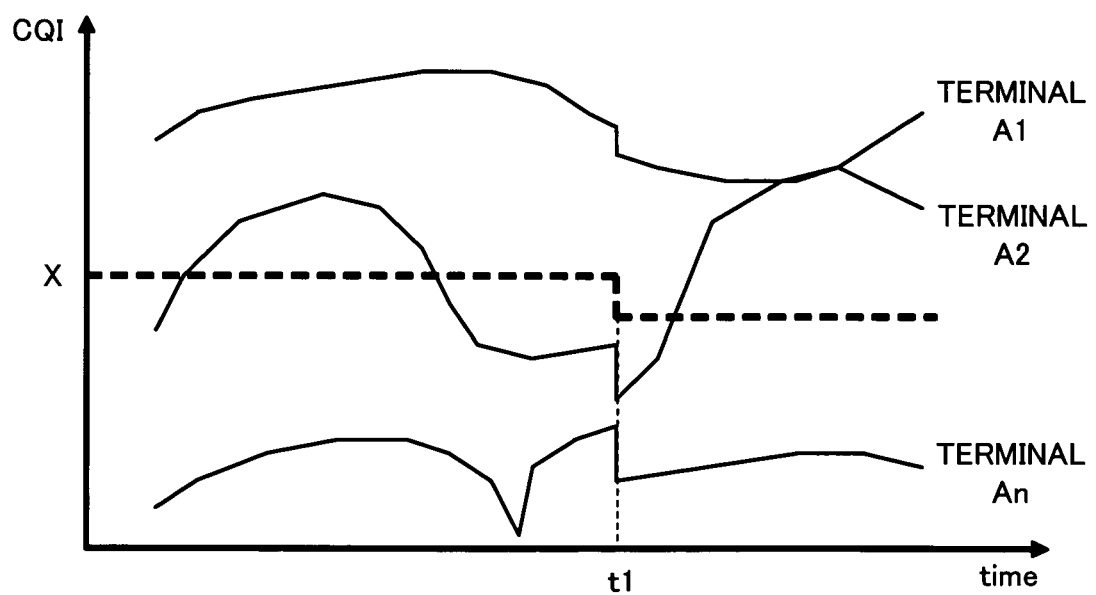
FIG. 23 shows temporal changes of CQIs with respect to a traffic channel f4.

FIG. 23 shows temporal changes of CQIs with respect to traffic channel f4. Assume that at time t1, the handover source base station 11 increases the power of traffic channel f4. In this case, the terminals located in the cell 32 of the base station 12 experience deteriorated SINR because the radio interference of the traffic channel f4 increases. The resulting low CQIs reduce the mean value X at time t1 as illustrated.

A terminal located closer to the cell 31 receives a smaller power level from the base station 12 and thus a small CQI is calculated. In the examples shown in FIGS. 22 and 23, the terminal An having a smaller CQI than the terminal A1 can be identified as being located closer to the cell 31 than the terminal A1 is.

Also, the terminal An located closer to the cell 31 is more liable to be influenced by the power change of the base station 11 and its CQI varies more greatly. For this reason, in the examples of FIGS. 22 and 23, the terminal An shows a greater change in CQI at time t1 than the terminal A1 does.

The mean value X derived from equation (1) is a statistical mean value of CQIs of the terminals A1, A2, . . . , An with respect to a certain traffic channel. Thus, by using the mean value X, it is possible to monitor CQI changes of the individual traffic channels.

To detect a traffic channel with the worst CQI and a traffic channel with the best CQI, a method utilizing the characteristic shown in expression (2) may be employed (method 1). While the power control is not performed in the handover source base station 11, expression (3) gives the answer "NO". When the power control is started, expression (3) gives the answer "YES". At this time, a worst-CQI traffic channel and a best-CQI traffic channel are detected according to the following equations (4) and (5), respectively:

$$f = \arg\min_i \{X(t, fi)\} \quad (4)$$

$$f = \arg\max_i \{X(t, fi)\} \quad (5)$$

Another method to detect best and worst channels is to compare the current mean value with an initial mean value X calculated while transmission power is equally distributed. This is referred to as the method 2. Provided that the monitoring of CQIs of individual traffic channels is started at time t0, the initial mean value X0 is represented by the following equation (6):

$$X0(fi) = X(t0, fi) \quad (6)$$

By comparing the initial mean value X0 with a current mean value according to the following equation (7), a difference P(fi) is obtained:

$$P(fi) = X(t, fi) - X0(fi) \quad (7)$$

Then, with respect to all traffic channels, it is determined according to the following expression (8) whether the difference P(fi) is smaller than a threshold THt or not:

$$YESorNO = \arg_{\forall j} if [|P(fi)| > THt] \quad (8)$$

If the difference P(fi) is equal to or greater than the threshold, it is recognized that a power control process has been started in the source base station 11, and in this case, a worst-CQI traffic channel and a best-CQI traffic channel are detected according to the following equations (9) and (10), respectively:

$$f = \arg\min_i \{P(fi)\} \quad (9)$$

$$f = \arg\max_i \{P(fi)\} \quad (10)$$

Figure 24:
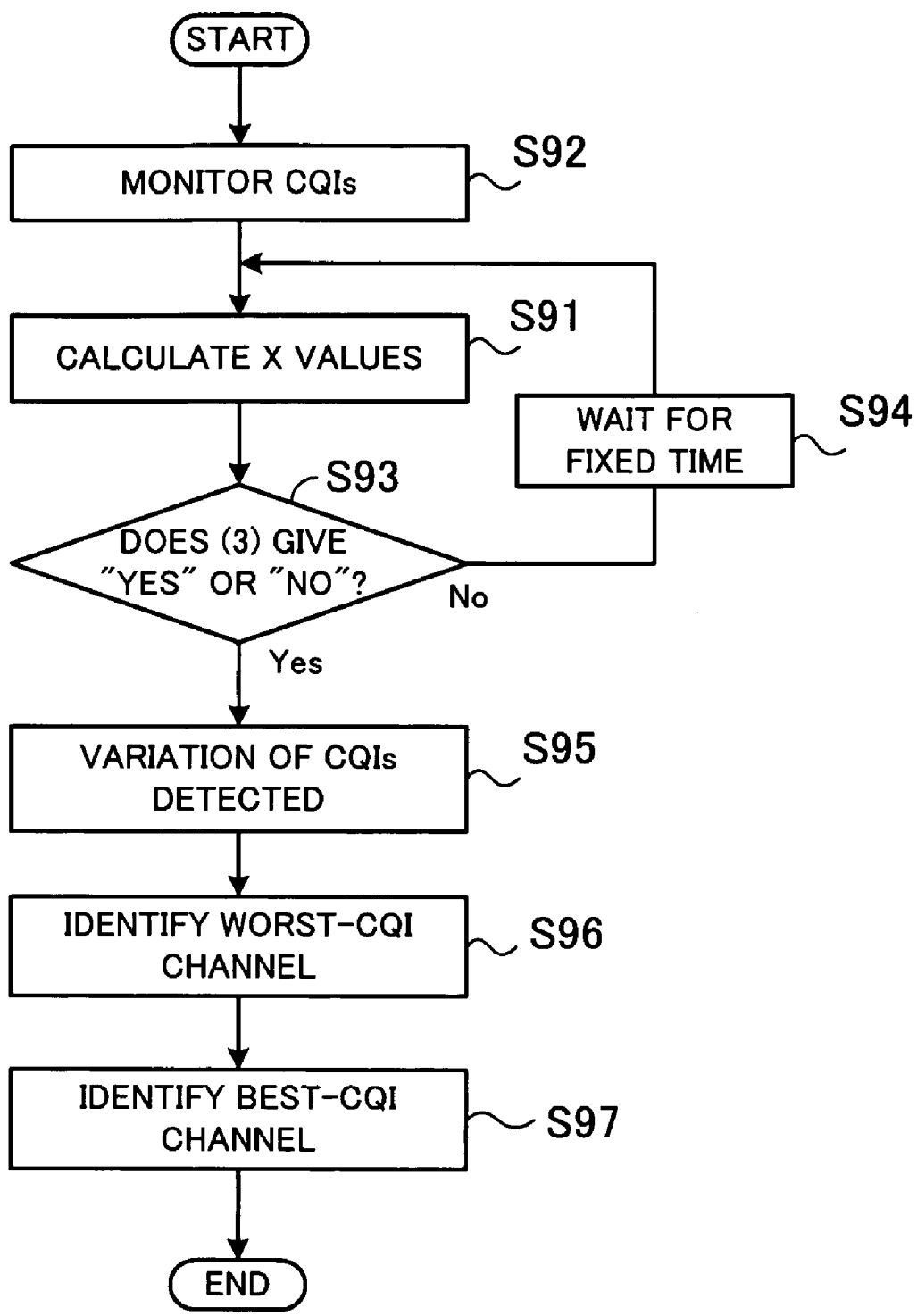
FIG. 24 is a flowchart of method 1.

The following explains how to detect traffic channels. First, the aforementioned method 1 will be explained with reference to the flowchart of FIG. 24.

Step S91: On receiving a handover request from the source base station 11, the target base station 12 starts to monitor CQIs.

Step S92: The base station 12 calculates the mean values X of individual traffic channels according to equation (1).

Step S93: The calculated mean values X are plugged into the expression (3). If expression (3) gives the answer "YES", the flow proceeds to Step S95; if expression (3) gives the answer "NO", the flow proceeds to Step S94.

Step S94: The base station 12 returns back to Step S92 some time later, in order to calculate mean values X of new CQIs with respect to individual traffic channels.

Step S95: The base station 12 determines that the CQIs of traffic channels are significantly different. Namely, the base station 12 determines that the handover source base station 11 has initiated a power control process.

Step S96: The base station 12 identifies a traffic channel with the worst CQI according to equation (4).

Step S97: The base station 12 identifies a traffic channel with the best CQI according to equation (5).

In this manner, the base station 12 identifies which traffic channels the neighboring base station 11 has boosted or cut.

Figure 25:
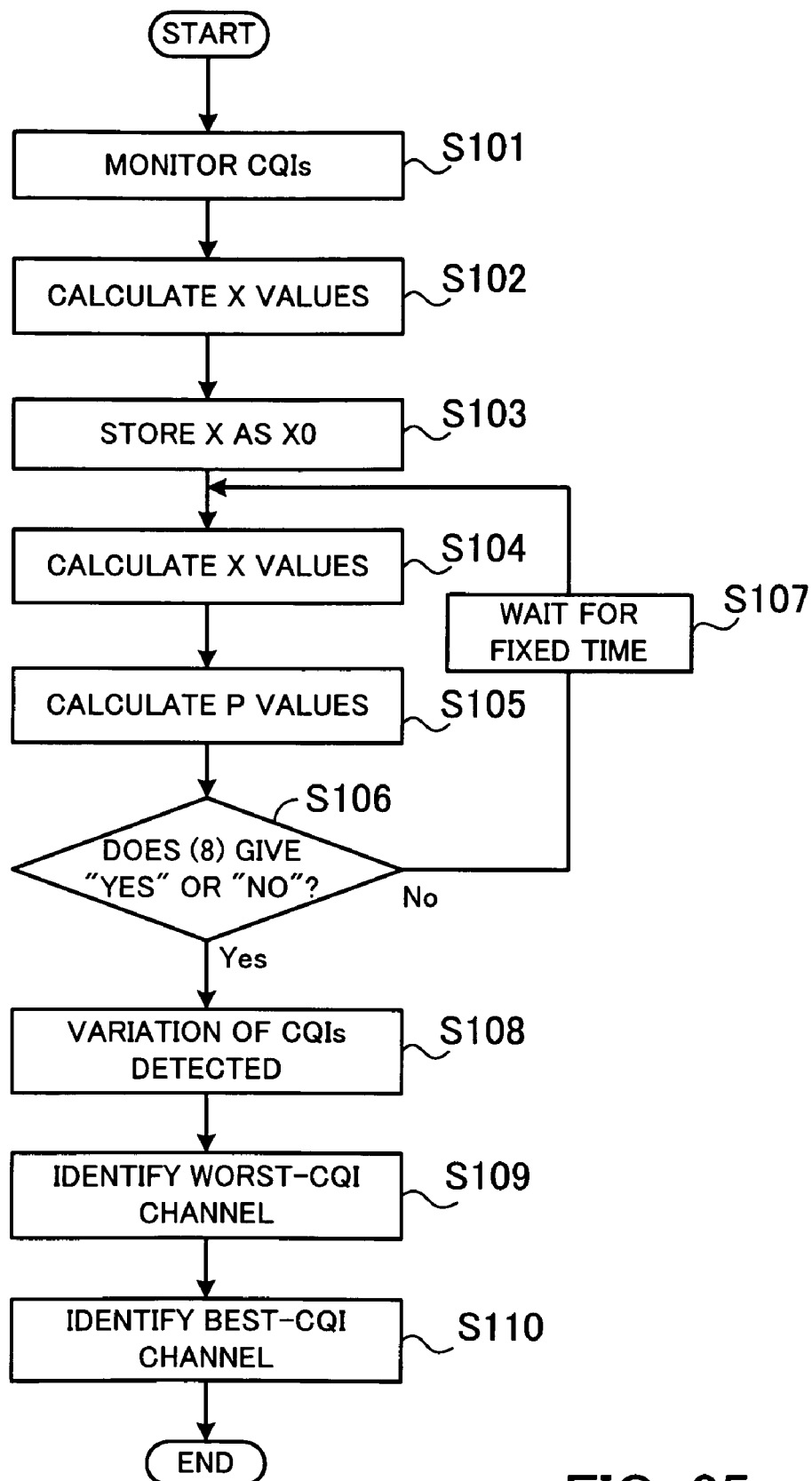
FIG. 25 is a flowchart of method 2.
Figure 26:
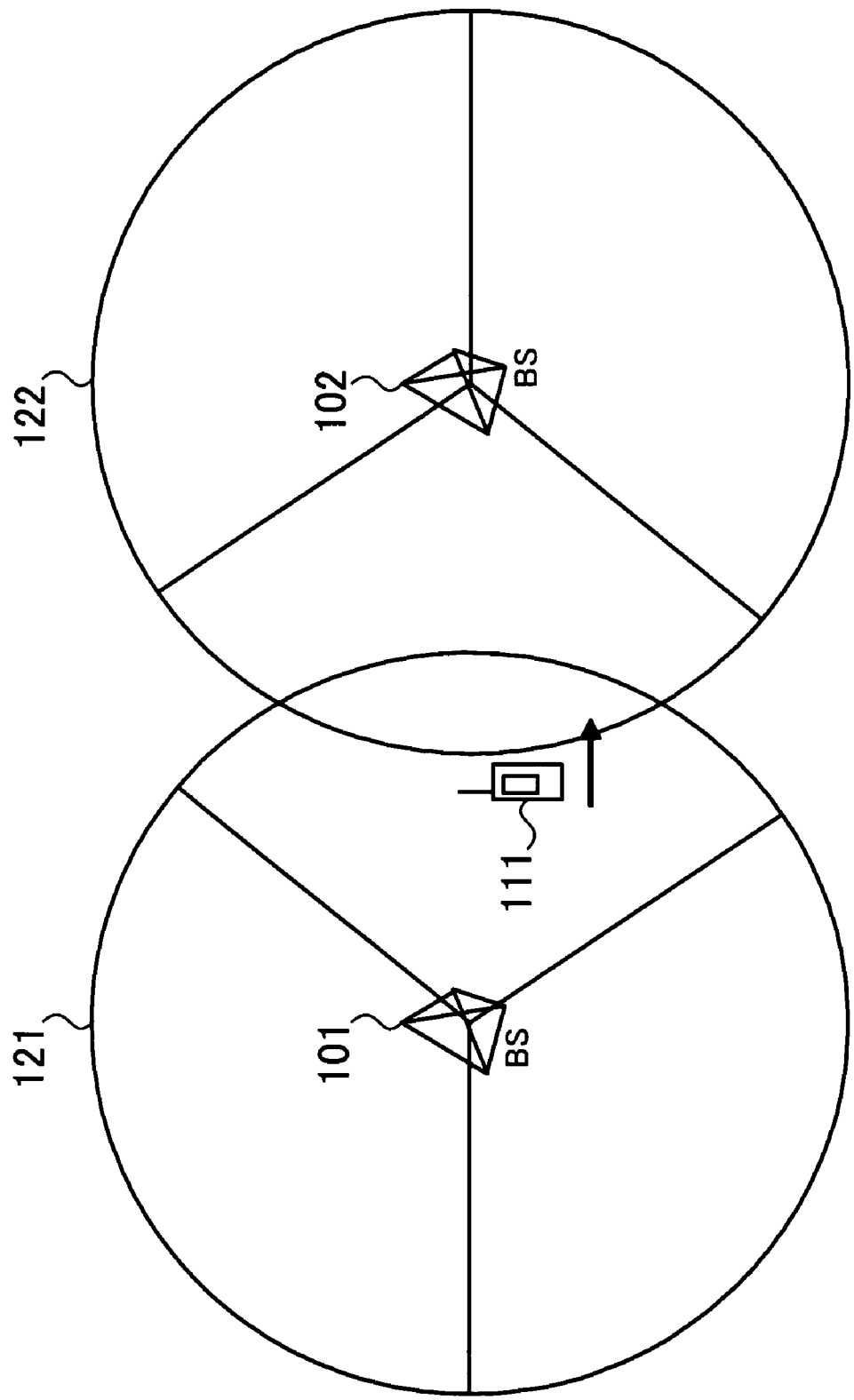
FIG. 26 illustrates a handover performed in a mobile communication system.
Figure 27:
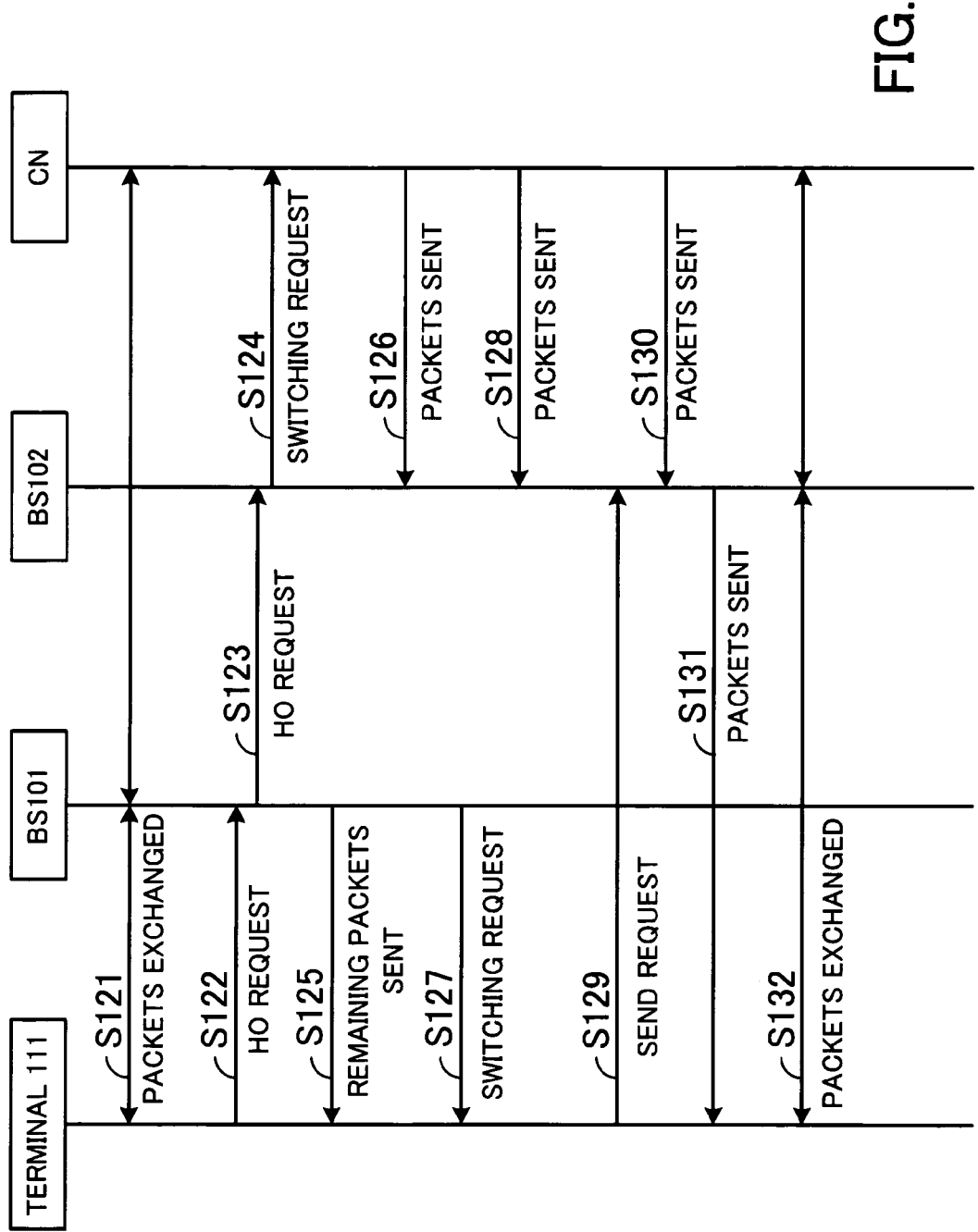
FIG. 27 illustrates an operation sequence of the mobile communication system of FIG. 26.
Figure 28:
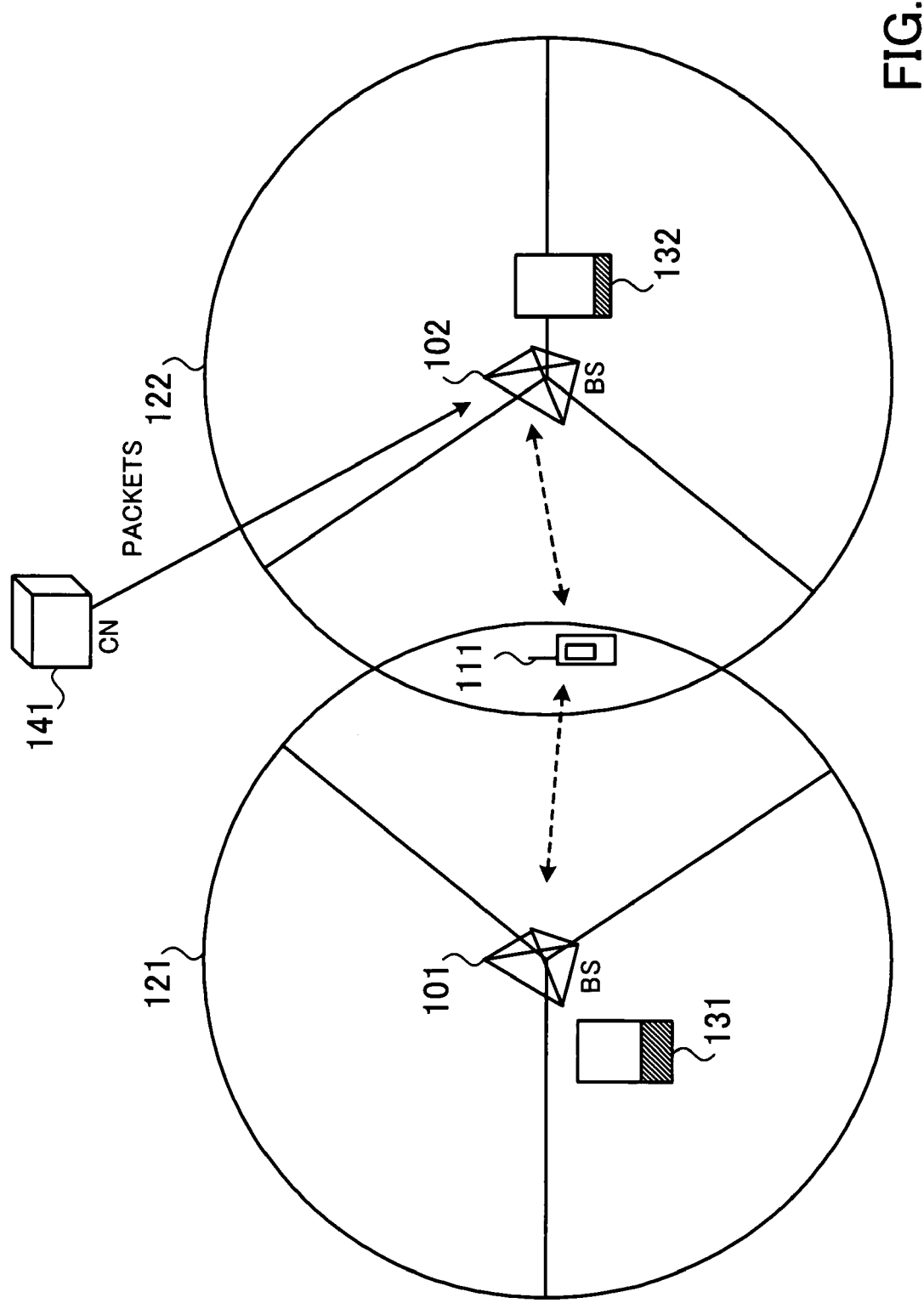
FIG. 28 illustrates remaining packets and accumulated packets.

FIG. 25 is a flowchart for the method 2.

Step S101: On receiving a handover request from the handover source base station 11, the handover target base station 12 starts to monitor CQIs.

Step S102: The base station 12 calculates a initial mean values X0 of individual traffic channels that are not subjected to the power control by the base station 11.

Step S103: The base station 12 stores the calculated initial mean values X0 in a memory.

Step S104: The base station 12 calculates the mean values X of individual traffic channels according to equation (1).

Step S105: The base station 12 plugs the stored initial mean values X0 and the calculated mean values X into equation (7) to calculate difference P(fi) for individual traffic channels.

Step S106: The base station 12 plugs the calculated difference P(fi) into expression (8). If expression (8) gives the answer "YES", the flow proceeds to Step S108; if expression (8) gives the answer "NO", the flow proceeds to Step S107.

Step S107: The base station 12 returns back to Step S104 some time later, in order to calculate mean values X of new CQIs with respect to individual traffic channels.

Step S108: The base station 12 determines that CQIs are significantly different from channel to channel. Namely, the source base station 11 has started a power control process.

Step S109: The base station 12 identifies a traffic channel with the worst CQI according to equation (9).

Step S110: The base station 12 identifies a traffic channel with the best CQI according to equation (10).

In this manner, the base station 12 identifies which traffic channels the neighboring base station 11 has boosted or cut.

In the foregoing description, the handover source base station 11 and the handover target base station 12 are explained separately as having different functions. In practice, however, these base stations can operate as both a handover target base station and a handover source base station. That is to say, when a handover is requested from a terminal in the cell of the base station 12, the base station 12 performs the power control identical with that explained above in relation to the base station 11, and the base station 11 performs the power control identical with that explained above in relation to the base station 12.

With the communication device according to the present invention, a frequency band with increased transmission power is allocated to a terminal whose connection is to be handed over to another base station. This feature permits the communication device to transmit remaining packets to the terminal with increased transmission power, whereby intercell interference on the transmission of the remaining packets can be reduced, making it possible to improve the throughput.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication device incorporated in a base station for allocating a plurality of frequency bands each to different terminals to enable wireless communication, the communication device comprising:

a power booster to increase transmission power of a common pilot signal or transmission power of one of the plurality of frequency bands or both thereof, depending on a handover request from a terminal requesting a handover from a source base station to a target base station; and a frequency band allocator to allocate the frequency band with the increased transmission power for transmission of a data signal from the source base station to the terminal requesting the handover;

wherein the power booster increases the transmission power of one of the plurality of frequency bands when the handover request designates the communication device as the source base station of the handover, and wherein the power booster increases the transmission power of the common pilot signal when the handover request designates the communication device as the source base station of the handover, but holds the transmission power of the common pilot signal when the handover request designates the communication device as the target base station of the handover.

2. The communication device according to claim 1, wherein the power booster increases the transmission power of one of the plurality of frequency bands when Quality of Service (QoS) of remaining packets destined for the terminal requesting the handover has exceeded a threshold.

3. The communication device according to claim 1, wherein the power booster increases the transmission power of one of the plurality of frequency bands by allotting transmission power of another one of the frequency bands to the one of the frequency bands.

4. The communication device according to claim 1, further comprising a throughput detector to detect throughputs of the terminals, wherein the power booster increases the transmission power of one of the plurality of frequency bands according to the throughputs.

5. The communication device according to claim 1, wherein the power booster increases the transmission power of one of the plurality of frequency bands upon initiation of the handover, and reverts the increased transmission power to an original level upon termination of the handover.

6. The communication device according to claim 1, further comprising:
 a wireless quality detector to detect wireless qualities of the terminals in a cell;
 a frequency band detector to detect, based on the wireless qualities, a frequency band whose transmission power has been increased by a handover source communication device; and
 a power controller to decrease transmission power of the detected frequency band.

7. The communication device according to claim 6, wherein the power controller decreases the transmission power of the interference detected frequency band by allotting the transmission power to a different one of the frequency bands.

8. The communication device according to claim 6, wherein the power controller decreases the transmission power for transmitting data but maintains the transmission power for transmitting a common pilot.

9. The communication device according to claim 6, wherein the power controller decreases the transmission power upon initiation of the handover, and reverts the decreased transmission power to an original level upon termination of the handover.

10. The communication device according to claim 6, wherein the power controller calculates a mean value of the wireless qualities with respect to each of the frequency bands and determines whether or not the handover source communication device has increased the transmission power, based on differences between the mean values of the frequency bands.

11. The communication device according to claim 6, wherein the power controller calculates a mean value of the wireless qualities with respect to each of the frequency bands, stores an initial mean value calculated in a state where the handover source communication device has not increased the transmission power, and determines whether or not the handover source communication device has increased the transmission power, based on a difference between a currently obtained mean value and the initial mean value.

12. A communication method for a communication device to allocate a plurality of frequency bands each to different terminals to enable wireless communication, the communication method comprising:
 receiving a handover request from a terminal requesting a handover from a source base station to a target base station;
 increasing transmission power of a common pilot signal or transmission power of one of the plurality of frequency bands or both thereof, depending on the received handover request; and
 allocating, in the source base station, the frequency band with the increased transmission power for transmission of a data signal from the source base station to the terminal requesting the handover;
 wherein the increasing increases the transmission power of one of the plurality of frequency bands when the received handover request designates the communication device as the source base station of the handover, and
 wherein the increasing increases the transmission power of the common pilot signal when the received handover request designates the communication device as the source base station of the handover, while holding the transmission power of the common pilot signal when the received handover request designates the communication device as the target base station of the handover.

13. A communication device incorporated in a base station for allocating a plurality of frequency bands each to different terminals to enable wireless communication, the communication device comprising:
 a power booster to increase transmission power of one of the plurality of frequency bands in response to a handover request received from a terminal requesting the communication device as a source base station to perform a handover to a target base station;
 a frequency band allocator, responsive to the handover request, to allocate the one of the plurality of frequency bands with the increased transmission power for transmission of a signal from the source base station to the terminal requesting the handover;
 a wireless quality detector to detect wireless qualities of the terminals in a cell;
 a frequency band detector to detect, based on the wireless qualities, a frequency band whose transmission power has been increased by a handover source communication device; and
 a power controller to decrease transmission power of the detected frequency band, wherein the power controller calculates a mean value of the wireless qualities with respect to each of the frequency bands, stores an initial mean value calculated in a state where the handover source communication device has not increased the transmission power, and determines whether or not the handover source communication device has increased the transmission power, based on a difference between a currently obtained mean value and the initial mean value.

* * * * *